United States Patent
Liang et al.

(10) Patent No.: US 11,521,099 B2
(45) Date of Patent: Dec. 6, 2022

(54) DICTIONARY GENERATION APPARATUS, EVALUATION APPARATUS, DICTIONARY GENERATION METHOD, EVALUATION METHOD, AND STORAGE MEDIUM FOR SELECTING DATA AND GENERATING A DICTIONARY USING THE DATA

(71) Applicant: CANON KABUSHIKI KAISHA, Tokyo (JP)

(72) Inventors: Zhuolin Liang, Tokyo (JP); Yusuke Mitarai, Tokyo (JP); Masafumi Takimoto, Kawasaki (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1343 days.

(21) Appl. No.: 15/870,627

(22) Filed: Jan. 12, 2018

(65) Prior Publication Data

US 2018/0204132 A1 Jul. 19, 2018

(30) Foreign Application Priority Data

Jan. 16, 2017 (JP) .............................. JP2017-005275

(51) Int. Cl.
*G06N 7/00* (2006.01)
*G06T 7/33* (2017.01)
(Continued)

(52) U.S. Cl.
CPC ........... *G06N 7/005* (2013.01); *G06K 9/6255* (2013.01); *G06K 9/6265* (2013.01);
(Continued)

(58) Field of Classification Search
None
See application file for complete search history.

(56) References Cited

U.S. PATENT DOCUMENTS 9,396,409 B2 * 7/2016 Zavesky .................. G06T 7/12
9,852,159 B2 * 12/2017 Yoshii ..................... G06T 7/337
(Continued)

FOREIGN PATENT DOCUMENTS

CN 101295401 A 10/2008
CN 106164980 A 11/2016
(Continued)

OTHER PUBLICATIONS

Giacomo Boracchi, et al., Novelty Detection in Images by Sparse Representations, Proceedings of IEEE Symposium on Intelligent Embedded Systems, pp. 47-54., Dec. 2014.
(Continued)

*Primary Examiner* — Tyler W. Sullivan
(74) *Attorney, Agent, or Firm* — Canon U.S.A., Inc. IP Division

(57) ABSTRACT

Embodiments of the present invention are directed to learning of an appropriate dictionary which has a high expression ability of minority data while preventing reduction of an expression ability of majority data. A dictionary generation apparatus which generates a dictionary used for discriminating whether data to be discriminated belongs to a specific category includes a generation unit configured to generate a first dictionary based on learning data belonging to the specific category and a selection unit configured to estimate a degree of matching of the learning data at each portion with the first dictionary using the generated first dictionary and select a portion of the learning data based on the estimated degree of matching, wherein the generation unit generates a second dictionary based on the selected portion of the learning data.

12 Claims, 17 Drawing Sheets

(51) Int. Cl.
*G06T 7/00* (2017.01)
*G06T 7/246* (2017.01)
*G06T 7/73* (2017.01)
*G06K 9/62* (2022.01)
*G06N 20/10* (2019.01)
*G06N 3/04* (2006.01)

(52) U.S. Cl.
CPC ........... *G06N 3/0454* (2013.01); *G06N 20/10* (2019.01); *G06T 7/0004* (2013.01); *G06T 7/248* (2017.01); *G06T 7/337* (2017.01); *G06T 7/75* (2017.01); *G06T 2207/20081* (2013.01); *G06T 2207/30148* (2013.01)

(56) References Cited

U.S. PATENT DOCUMENTS

| | | | | |
|---|---|---|---|---|
| 10,148,680 | B1* | 12/2018 | Segev | H04L 63/1425 |
| 10,755,395 | B2* | 8/2020 | Yu | G06K 9/6249 |
| 10,902,285 | B2* | 1/2021 | Yoshii | G06K 9/6262 |
| 11,049,004 | B1* | 6/2021 | Segev | G06N 3/088 |
| 11,085,823 | B2* | 8/2021 | Ben-Shahar | G01J 3/28 |
| 11,238,350 | B2* | 2/2022 | Cormier | G06N 5/048 |
| 2013/0148872 | A1* | 6/2013 | Aisaka | G06T 3/4053 |
| | | | | 382/128 |
| 2015/0160319 | A1* | 6/2015 | Choi | G01R 33/5611 |
| | | | | 324/309 |
| 2016/0239969 | A1* | 8/2016 | Davatzikos | G06T 7/0014 |
| 2018/0373929 | A1* | 12/2018 | Ye | G06V 10/44 |
| 2021/0049421 | A1* | 2/2021 | Tandecki | G06F 16/221 |

FOREIGN PATENT DOCUMENTS

| | | |
|---|---|---|
| JP | 2009-002743 A | 1/2009 |
| JP | 2010-198476 A | 9/2010 |
| JP | 2011-007553 A | 1/2011 |
| JP | 2015-191334 A | 11/2015 |

OTHER PUBLICATIONS

Michael Aharon, et al., K-SVD: An Algorithm for Designing Overcomplete Dictionaries for Sparse Representation, IEEE Transactions on Signal Processing, vol. 54, No. 11, Nov. 2006.

Carrera, D., et al., "Scale-invariant anomaly detection with multiscale group-sparse models"; 2016 IEEE International Conference on Image Processing (ICIP), pp. 3892-3896; Sep. 2016.

* cited by examiner

DICTIONARY GENERATION APPARATUS, EVALUATION APPARATUS, DICTIONARY GENERATION METHOD, EVALUATION METHOD, AND STORAGE MEDIUM FOR SELECTING DATA AND GENERATING A DICTIONARY USING THE DATA

BACKGROUND OF THE INVENTION

Field of the Invention

The present invention relates to a dictionary learning technique for specifying a category of data.

Description of the Related Art

As a conventional method for determining whether data of which a category is unknown belongs to a specific category, there is a method for extracting features common to many data pieces belonging to the specific category and making a determination depending on whether the similar features can be extracted from the unknown data. Dictionary learning is proposed as a method for extracting common features regarding a specific category. The dictionary learning is a technique for obtaining several reference data pieces representing a multidimensional data space and generating a dictionary constituted of sets of the reference data pieces. A dictionary is generated from data pieces belonging to a specific category, and thus data of the specific category can be appropriately expressed. In addition, when a category is determined, data is reconfigured with respect to data of which a category is unknown using appropriate reference data from the dictionary, and a likelihood expressing that data is likely to belong the specific category from an index such as a reconfiguration error.

A method for determining reference data relates to an expression ability of a dictionary. In Giacomo Boracchi et al., 2014, "Novelty Detection in Images by Sparse Representations", in Proceedings of IEEE Symposium on Intelligent Embedded Systems, pp. 47-54 (hereinbelow, referred to as a first non-patent literature), a technique is described which iteratively corrects reference data to reduce an average of reconfiguration errors with respect to entire learning data pieces in order to express a normal scanning electron microscope (SEM) image. Further, the first non-patent literature describes a method for using a deviation degree of reconfiguration information calculated by the dictionary from a normal range in order to detect an abnormal portion in an image.

However, according to the method described in the first non-patent literature, the dictionary is learned so as to minimize an average reconfiguration error of the entire data pieces. Therefore, when a portion of data pieces is difficult to be reconfigured, the reconfiguration error becomes higher in the portion of data pieces, and an issue occurs that the dictionary lacks an expression ability. Specifically, when a data set includes both of data having a high occurrence frequency (hereinbelow, referred to as majority data) and data having a low occurrence frequency (hereinbelow, referred to as minority data), an issue occurs that the minority data less contributes to the average reconfiguration error and is difficult to be expressed.

The issue relates to a size of the dictionary and, especially, is likely to occur when the number of reference data pieces is small in the dictionary. The number of reference data pieces may be uniquely increased, however, there is an issue that the reference data may excessively adopted to an outlier existing in data pieces belonging to the specific category, and data in a non-specific category may be expressed. Thus, it is desirable that a dictionary has an appropriate size.

Regarding the above-described issue, Japanese Patent Application Laid-Open No. 2010-198476 describes a technique for reducing a density of majority data pieces and then generating a dictionary together with minority data pieces. Accordingly, the issue that learned reference data is deflected to the center of the majority data than the center of the minority data is reduced, and an ability to express the minority data can be improved.

However, according to the technique described in Japanese Patent Application Laid-Open No. 2010-198476, a method for specifying the majority data is heuristic, and there is a possibility to reduce an ability to express the majority data since the density of the majority data is reduced. As described above, dictionary learning has an issue that minority data is difficult to be appropriately expressed.

SUMMARY OF THE INVENTION

Embodiments of the present invention are directed to learning of an appropriate dictionary which has a high expression ability of minority data while preventing reduction of an expression ability of majority data in consideration of the above-described issues.

A dictionary generation apparatus which generates a dictionary used for discriminating whether data to be discriminated belongs to a specific category according to embodiments of the present invention includes a generation unit configured to generate a first dictionary based on learning data belonging to the specific category, and a selection unit configured to estimate a degree of matching of the learning data at each portion with the first dictionary using the generated first dictionary and select a portion of the learning data based on the estimated degree of matching, wherein the generation unit generates a second dictionary based on the selected portion of the learning data.

Further features of the present invention will become apparent from the following description of exemplary embodiments with reference to the attached drawings.

DESCRIPTION OF THE EMBODIMENTS

Various exemplary embodiments of the present invention will be described in detail below with reference to the attached drawings.

Figure 1:
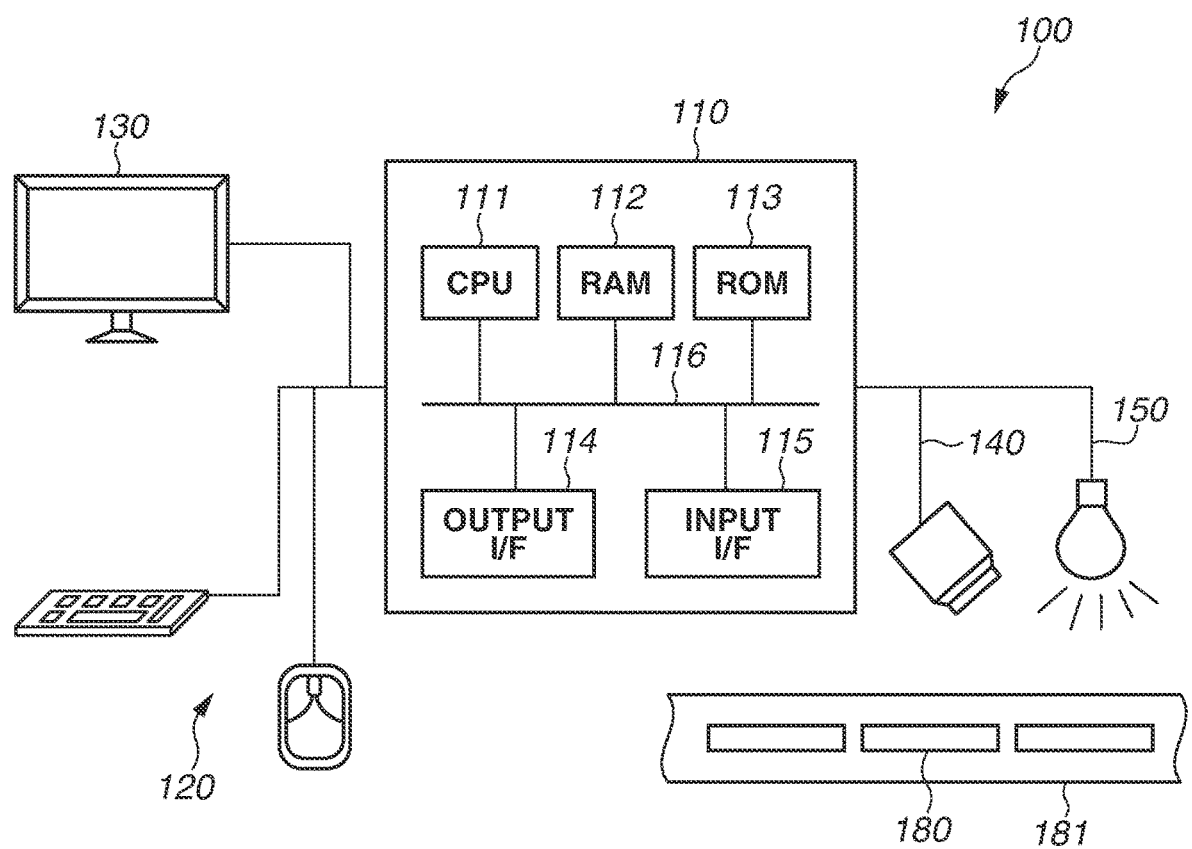
FIG. 1 is an overall view of an inspection system.

FIG. 1 is an overall view of an inspection system 100 according to a first exemplary embodiment. The inspection system 100 according to the present exemplary embodiment generates a dictionary used for performing quality determination of an inspection target object by a surface appearance inspection and determines quality (i.e., good or bad) of an object using the generated dictionary. More specifically, the inspection system 100 uses a captured image of an object which is known as a good quality piece as learning data and generates a dictionary expressing a feature of the good quality piece as a specific category. Further, the inspection system 100 regards data to be a target of quality determination (determination target data) as data of which a category is unknown and performs quality determination by determining whether the data belongs to a specific category (a category of the good quality piece) using the dictionary.

An inspection target 180 is conveyed by a belt conveyor 181 and determined whether a good quality piece or a defective piece by an information processing apparatus 110. An example of the inspection target 180 is a metal part, a rubber molded product, a plastic molded product, a glass molded product such as a lens, a printed board, or the like. When a flaw or an unevenness, which is not found on a good quality piece, is caused on a surface of the inspection target 180 by a change in a machining process and the like, the inspection target 180 is detected as a defective piece. An illumination apparatus 150 provides an appropriate illumination condition so that a surface condition of the inspection target 180 can be clearly viewed. An image capturing apparatus 140 includes a video camera which can capture a video of the surface of the inspection target 180 and the like and transmits the captured video to the information processing apparatus 110.

An input apparatus 120 includes a keyboard and a mouse and receives an instruction to start execution of a program from a user. A display apparatus 130 includes a monitor and the like and displays an intermediate processing result and a determination result. As an example of display, a surface picture of the inspection target is displayed, and an inspection result thereof is displayed as OK/NG in a peripheral area of the picture. Further, the display apparatus 130 may display a determination result for each local area in an image instead of the quality determination of an entire image and a likelihood of a good quality piece in addition to OK/NG.

A hardware configuration is described which is implemented in the information processing apparatus 110 according to the present exemplary embodiment. A central processing unit (CPU) 111 comprehensively controls each device connected to a bus 116. A read only memory (ROM) 113 stores each processing program, an operating system (OS), a device driver according to the present exemplary embodiment, and the like. A random access memory (RAM) 112 temporarily stores the program when the CPU 111 performs processing. An input interface (I/F) 115 converts information input from an external operation apparatus and the like into a format which can be processed by the information processing apparatus 110. An output I/F 114 converts information to be output into a format which can be processed by the display apparatus 130 and the like. The CPU 111 reads a processing step and a program stored in the ROM 113, temporarily stores them in the RAM 112, and executes processing according to each flowchart described below. As another example, the information processing apparatus 110 may include hardware, such as a calculation unit and a circuit which use the CPU 111 and correspond to each function of a software configuration described below.

The information processing apparatus 110 according to the first exemplary embodiment generates a dictionary by a staged dictionary generation method. More specifically, the information processing apparatus 110 generates a dictionary for reconfiguring a portion of a data group in each stage and determines whether the generated dictionary can achieve approximation of the data based on reconfiguration information of each data with respect to the generated dictionary. Further, the information processing apparatus 110 generates a dictionary of a next stage using a data set which cannot be approximated. In the staged dictionary generation method according to the present exemplary embodiment, binary determination is made based on whether the approximation is achieved or not, therefore the number of data pieces to be used in the dictionary generation decreases as the stages are proceeded. Thus, a type of this dictionary generation may be referred to as a filter type.

Processing of the information processing apparatus 110 can be roughly classified into two processes, namely a dictionary generation process in which dictionary generation processing is performed for generating the dictionary offline in stages and an evaluation process in which evaluation processing is performed for evaluating a likelihood that data as an inspection target belongs to the specific category using the dictionary online. In the dictionary generation process, the information processing apparatus 110 capture images of an object which is known as a good quality piece, samples a large number of small images (hereinbelow, referred to as patches) from a plurality of the captured images, and generates a dictionary constituted of a plurality of reference patches from sets of good quality piece patches. On the other hand, in the evaluation process, the information processing apparatus 110 captures an image of an object of which quality is unknown and obtains a plurality of patches from the image using a method similar to that in the dictionary generation process. Subsequently, the information processing apparatus 110 reconfigures each patch using the dictionary generated in the dictionary generation process and evaluates a likelihood that the patch is a good quality piece (belongs to the specific category) according to a matching degree of the patch with the dictionary. In the evaluation process, the information processing apparatus 110 may only calculate a likelihood of quality and determine quality of each patch from the likelihood. As another example, the information processing apparatus 110 may integrate evaluation results of a plurality of patches constituting an image and calculate a likelihood and quality of an entire image.

Figure 2:
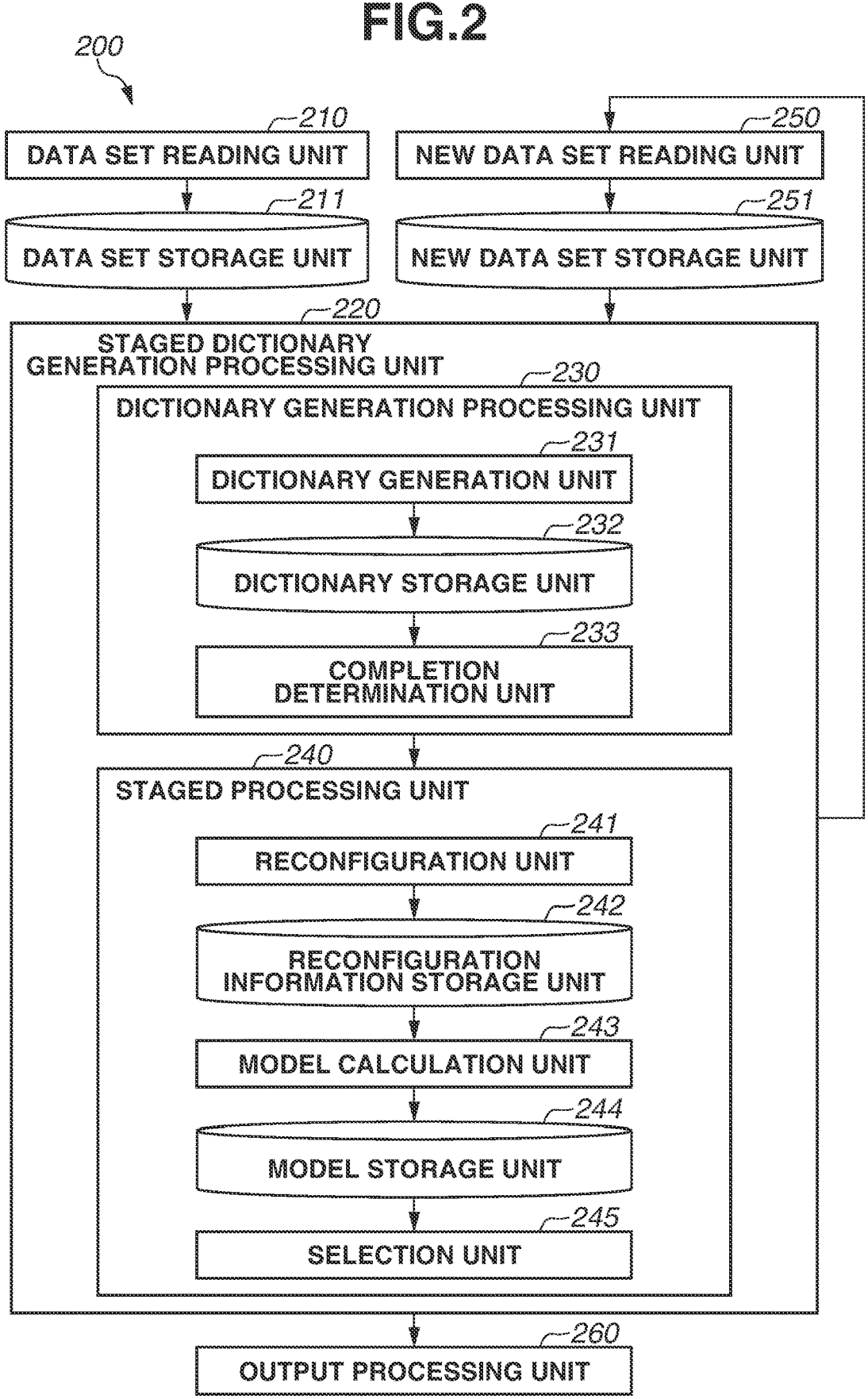
FIG. 2 illustrates a software configuration of a processing unit for performing dictionary generation processing.
Figure 3:
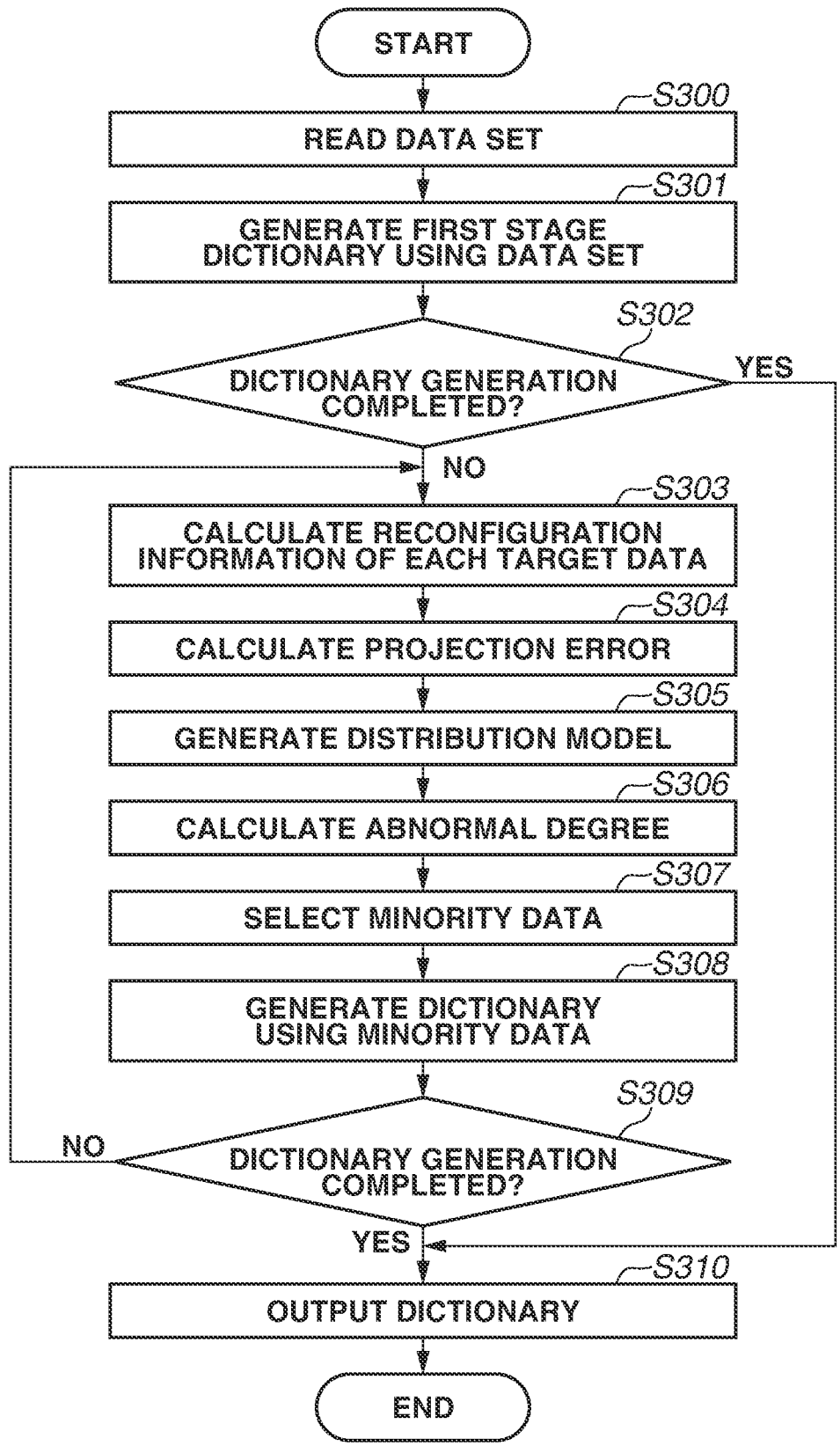
FIG. 3 is a flowchart illustrating dictionary generation processing.

FIG. 2 illustrates a software configuration of a processing unit 200 related to dictionary generation processing by the information processing apparatus 110. FIG. 3 is a flowchart illustrating the dictionary generation processing. As illustrated in FIG. 2, the processing unit 200 includes a data set reading unit 210, a data set storage unit 211, a staged dictionary generation processing unit 220, a new data set reading unit 250, a new data set storage unit 251, and an output processing unit 260. The staged dictionary generation processing unit 220 includes a dictionary generation processing unit 230 and a staged processing unit 240. The dictionary generation processing unit 230 includes a dictionary generation unit 231, a dictionary storage unit 232, and a completion determination unit 233. The staged processing unit 240 includes a reconfiguration unit 241, a reconfiguration information storage unit 242, a model calculation unit 243, a model storage unit 244, and a selection unit 245. A function of each unit is described along with the dictionary generation processing (FIG. 3).

In step S300 in FIG. 3, the data set reading unit 210 obtains a data set for learning and reads the data set into the data set storage unit 211. The data set for learning includes a plurality of patches sampled from a captured image obtained by capturing an image of an object preliminarily known as a good quality piece. According to the present exemplary embodiment, in patch sampling, 8*8 pixels patches are comprehensively extracted without overlapping from a captured gray scale image. The more number of patches is included in the data set, the better the capability of the data set becomes. However, the number of patches may be greater than the number of reference patches in the dictionary to be generated.

As another example, an extracting method allowing overlap and a method for extracting a patch from a random position may be adopted. When a patch protrudes from an image, the patch may be moved in a parallel direction so as to be included in the image or clipped out after image interpolation. A size of a patch may not be 8*8 pixels, and a method for empirically adopting an appropriate size may be adopted. According to the present exemplary embodiment, data is a 8*8=64 dimensional vector, and a data set is a set of a plurality of vectors. As another example, when data is recorded, a position at which a patch is extracted may be recorded in addition to a vector.

Processing in subsequent steps S301 to S309 is staged dictionary generation processing. A data set as a processing target in the staged dictionary generation processing is referred to as a target data set. In addition, data included in the target data set is referred to as target data. The target data set in an initial stage is a data set received by the data set reading unit 210, and the target data set in a subsequent stage is a data set obtained by performing filtering on the data set received by the data set reading unit 210. The data set after filtering is selected via below-described processing by the staged processing unit 240 and read into the new data set storage unit 251 by the new data set reading unit 250.

In step S301, the dictionary generation unit 231 in the dictionary generation processing unit 230 performs processing for generating K pieces of reference data (dictionary) based on the initial target data set. The reference data has a format similar to that of the target data and is referred to when unknown data is reconfigured. The number K of the reference data pieces is an arbitrary value. In the staged dictionary generation, a size of the dictionary in each stage may be small. According to the present exemplary embodiment, a size K of the reference data group is 16. In addition, the dictionary generated in step S301 is referred to as a first stage dictionary.

The dictionary generation unit 231 further corrects the generated dictionary by repeating K times singular value decomposition (K-SVD) and orthogonal matching pursuit (OMP). K-SVD is a dictionary generation method using sparse coding which can be referred to the first non-patent literature. OMP is a data reconfiguration method. In OMP, the reference data is selected from the reference data group so as to reduce a reconfiguration error to each target data, and data is approximated by a weighted linear combination of the selected reference data pieces. The approximation processing is repeated until the number of the selected reference data pieces becomes k pieces. The weight of each reference data is also referred to as a linear combination coefficient and a reconfiguration coefficient. A set of the weights of all the reference data pieces is referred to as a linear combination coefficient vector and a reconfiguration coefficient vector.

In OMP, processing is performed for calculating an optimum solution of (Formula 1).

$$\min_{x_i} \|y_i - Dx_i\|_2^2 \text{ s.t. } \|x_i\|_0 \le k \quad \text{[Formula 1]}$$

In Formula 1, $y_i$ {i=1, 2, ..., N} represents the target data set, and, for example, data stored in the data set storage unit 211 and the new data set storage unit 251. "i" represents an index of data, and "N" represents the number of the target data pieces included in the target data set. "D" represents the reference data group or the dictionary. "$x_i$" represents a reconfiguration coefficient vector. "$\|y_i-Dx_i\|_2$" represents a reconfiguration error. "$\|\cdot\|_0$" represents an L0 norm, and "$\|\cdot\|_2$" represents an L2 norm. "k" represents an upper limit of the number of pieces of which a coefficient of the reference data is not zero and represents a sparse constraint. According to the present exemplary embodiment, the dictionary generation unit 231 calculates the optimum solution of (Formula 1) by setting k=2. Accordingly, a sparse solution is obtained in which two values at maximum are not zero, and other values are zero in elements of the reconfiguration coefficient vector.

K-SVD is a method for alternately performs dictionary correction processing and reconfiguration processing so as to efficiently reconfigure the target data included in the target data set with the small number of the reference data combination and can be referred to Michal Aharon et al., 2006, "K-SVD: An Algorithm for Designing of Overcomplete Dictionaries for Sparse Representation", IEEE Trans. Signal Processing, (hereinbelow referred to as the second non-patent literature).

The method for generating the reference data group is not limited to that according to the present exemplary embodiment. As another example, the dictionary generation unit 231 may use a dictionary generation method which uses an L1 norm of a combination coefficient of sparse coding when the dictionary is generated, a method for randomly selecting from an auto encoder, principal component analysis, K-means clustering, and the target data set, and other methods.

After the processing in step S301, in step S302, the completion determination unit 233 determines whether to complete the dictionary generation processing. When determining to complete the processing (YES in step S302), the completion determination unit 233 advances the processing to step S310. When not determining to complete the processing (NO in step S302), the completion determination unit 233 advances the processing to step S303.

The completion determination unit 233 perform quality determination on a verification image using the generated dictionary and determines whether to complete the dictionary generation according to the determination result. More specifically, the completion determination unit 233 uses respective captured images of an object known as a good quality piece and an object known as a defective piece as the verification images. Subsequently, the completion determination unit 233 performs the quality determination based on a matching degree with the dictionary and determines to complete the dictionary generation when a ratio of correctly determining the good quality piece in the true good quality pieces exceeds a certain threshold value.

As described above, the completion determination unit 233 according to the present exemplary embodiment determines quality as the entire image, so that it is necessary to tally matching degrees with the dictionary of all patches extracted from the image. More specifically, the completion determination unit 233 calculates an average value, a maximum value, and dispersion of the matching degrees and generates a feature vector of the image. Next, the completion determination unit 233 generates a good quality piece classifier by a one class support vector machine (SVM) using the feature vector extracted from a learning image set. Subsequently, the completion determination unit 233 performs quality determination on the verification image using the generated good quality piece classifier. According to the present exemplary embodiment, the completion determination unit 233 uses the one class SVM as the good quality piece classifier, however, may use a discrimination method, such as a nearest neighbor method, a subspace method, a Fisher's discrimination method, and a neural network. In addition, the completion determination unit 233 may use a defect image for learning of the classifier.

Processing in subsequent steps S303 to S307 is processing for selecting minority data. The minority data is data of which an occurrence frequency is low in the data set. In step S303, the reconfiguration unit 241 reconfigures each target data included in the target data set by the OMP processing indicated in (Formula 1) using the dictionary generated immediately before, namely the dictionary stored in the dictionary storage unit 232 and calculates reconfiguration information. The reconfiguration unit 241 stores the reconfiguration information in the reconfiguration information storage unit 242. The processing in step S303 is an example of the reconfiguration processing for obtaining the reconfiguration information by reconfiguring each of a plurality of data pieces used in generation of the dictionary.

The dictionary used in the processing in step S303 is the dictionary generated immediately before at a time point of the processing in step S303. In other words, in the processing order of step S301, NO in step S302, and step S303, the dictionary generated in the processing in step S301 is used. On the other hand, in a case where the processing is performed in steps S303 to S307 and then returns to step S303 by NO in step S309, the dictionary generated in the processing in step S308 immediately before is used. Further, the target data used in the processing in step S303 is the data set used for generation of the dictionary in the processing in step S308.

The reconfiguration information is an evaluation value representing a similarity of each target data to the dictionary in a plurality of references and includes a plurality of vectors constituted of a plurality of evaluation values of the similarity corresponding to the plurality of references. As another example, a dimension number of a reconfiguration vector included in the reconfiguration information may be one dimension.

As another example, the reconfiguration unit 241 may use a method for calculating the reconfiguration information using multiresolution data as a method which is robust to a defect of which a size is unknown. In this case, the reconfiguration unit 241 generates a plurality of images having different resolutions from each of a plurality of data pieces (images) included in the data set. The present processing is an example of multiresolution processing. Further, the reconfiguration unit 241 may perform staged dictionary generation for each resolution from the reconfiguration information of the image of each resolution. As another example, the reconfiguration unit 241 may generate a dictionary from edge images in horizontal, vertical, and oblique directions of the target data (image) and calculate the reconfiguration information with respect to the generated dictionary.

In this case, the reconfiguration unit 241 performs Haar Wavelet conversion on the target data (original image) and learns the dictionary with respect to each of a smoothed image and high-frequency component extracted images in horizontal, vertical, and diagonal directions in a multiple resolution image as conversion results. The reconfiguration unit 241 further calculates a reconfiguration error and an L1 norm of the reconfiguration coefficient vector in each dictionary and finally obtains a vector connecting all of these evaluation values as the reconfiguration information. For example, when a scale number of the multiple resolution is 8, a reconfiguration information vector in 8*4*2=64 dimensions in total is obtained. The L1 norm is obtained by (Formula 2). "d" in (Formula 2) is a dimension number of the reconfiguration coefficient vector.

$$\|x_i\|_1 = |x_{i0}| + |x_{i1}| + \ldots + |x_{i(d-1)}| \qquad \text{[Formula 2]}$$

$$r = \begin{bmatrix} \|y - Dx\|_2 \\ \|x\|_1 \end{bmatrix} \qquad \text{[Formula 3]}$$

To simplify the description, (Formula 3) indicates the reconfiguration vector generated from a single hierarchy. "$\|y-Dx\|_2$" represents a reconfiguration error, "$\|\bullet\|_1$" represents an L1 norm, "x" represents a reconfiguration coefficient vector calculated by sparse coding and the like, "y" represents evaluation data, "D" represents a dictionary, and "r" represents a reconfiguration information vector of the evaluation data.

The reconfiguration information is an example of information indicating a degree of matching of data with the dictionary. According to the present exemplary embodiment, the reconfiguration information is used as the information indicating the degree of matching, however, the information indicating the degree of matching is not limited to the reconfiguration information. The information indicating the degree of matching may be a value indicating a similarity of data to the dictionary, a value indicating a deviation degree of data with respect to the dictionary, and the like. In addition, a type and the number of parameters such as a feature amount to be a reference of each index may not be particularly limited. The reconfiguration information includes, for example, the reconfiguration error, the L1 norm of the reconfiguration coefficient vector, and an index of the reference data used for reconfiguration. Further, the reconfiguration information may be one of or a combination of some of these information pieces.

Next, in step S304, the model calculation unit 243 calculates a projection error ($\|r-WW^Tr\|_2$) of each of a plurality of the reconfiguration information pieces corresponding to each target data stored in the reconfiguration information storage unit 242. More specifically, the model calculation unit 243 performs principal component analysis using the reconfiguration vector representing the reconfiguration information and obtains a partial space. Further, the model calculation unit 243 projects the reconfiguration information vector of each target data onto the generated partial space and calculates a projection error thereof. In this regard, W={$u_1, u_2, \ldots, u_{dk}$} represents a set of characteristic vectors obtained by performing the principal component analysis on the reconfiguration information of the target data, and "$d_k$" represents the number of characteristic vectors to be used. The processing in step S304 is an example of projection error evaluation processing for calculating a projection error.

Next, in step S305, the model calculation unit 243 calculates (generates) a distribution model of a plurality of projection errors obtained for each of a plurality of the target data pieces. More specifically, the model calculation unit 243 regards an average $\mu_0$ and a standard dispersion $\sigma_0$ of a projection error as a distribution model. The processing in step S305 is an example of model generation processing for generating a distribution model of a projection error.

As another example, the model calculation unit 243 may presume a distribution model of a vector representing the reconfiguration information described in the second non-patent literature as Gaussian distribution. As further another example, the model calculation unit 243 may use not a single peak Gaussian distribution but a complicated distribution such as mixture Gaussian distribution as the distribution model. In this case, the model calculation unit 243 presumes a distribution of a reconfiguration information vector set {$r_i$} {i=1, 2, ..., N} of the target data set by a mixture of the Gaussian distribution of KGMM pieces and generates a model by the expectation-maximization (EM) algorithm.

A value of a projection error becomes larger as a coincidence degree of the reconfigured data and the target data is lower. In other words, a projection error is an evaluation value indicating whether each target data matches with the dictionary. According to the present exemplary embodiment, the information processing apparatus 110 does not use the projection error as it is, but calculates a value obtained by normalizing the projection error by the average $\mu_0$ and the standard dispersion $\sigma_0$ as an abnormal degree, and evaluates a degree of matching of each data with the dictionary by this index.

Next, in step S306, the selection unit 245 calculates an abnormal degree of each target data based on the distribution model. The selection unit 245 further sets a threshold value of the abnormal degree for separating an abnormal range and a normal range of the target data. As described above, the selection unit 245 uses the average and the dispersion of the projection error to the distribution model and calculates the value normalizing the projection error by the average $\mu_0$ and the standard dispersion $\sigma_0$ as the abnormal degree. The abnormal degree is an example of an index value of the degree of matching of the corresponding data with the dictionary. The present processing is an example of conversion processing for converting a projection error into an index value. The selection unit 245 sets a range in which the projection error is the average to $\mu_0$ a value greater than or equal to $n\sigma_0$ as the abnormal range and determines a range other than that as the normal range. More specifically, the selection unit 245 sets a threshold value thres.1 in (Formula 4).

$$(\|r-WW^T r\|_2 - \mu_0)/\sigma_0 < \text{thres.1} \quad [\text{Formula 4}]$$

The left side of (Formula 4) represents an abnormal degree. The threshold value thres.1 is a threshold value for determining a boundary between normal and abnormal of the abnormal degree, and according to the present exemplary embodiment, a condition that the threshold value is set as thres.1 is n=1 is determined in advance. As another example, the selection unit 245 may set a threshold value according to a user operation. The threshold value may be the same as a threshold value for discriminating whether an unknown input image is normal or abnormal using the generated dictionary.

Next, in step S307, the selection unit 245 selects the target data corresponding to the reconfiguration vector r which does not satisfy (Formula 4) as minority data. The present processing is an example of selection processing for selecting the minority data based on the distribution model.

As another example of the processing in steps S306 and S307, the selection unit 245 may presume the distribution model as the Gaussian distribution and select the minority data based on a deviation degree from the Gaussian distribution. More specifically, the selection unit 245 calculates a Mahalanobis distance of each data from the Gaussian distribution as the abnormal degree. Subsequently, the selection unit 245 selects the target data corresponding to the reconfiguration vector r which does not satisfy (Formula 5) as the minority data.

$$\sqrt{(r-\mu)^T \Sigma^{-1}(r-\mu)} < \text{thres.2} \quad r \in \Re^d, \mu \in \Re^d, \Sigma \in \Re^{d \times d} \quad [\text{Formula 5}]$$

The left side of (Formula 5) represents a Mahalanobis distance from Gaussian distribution, and "$\mu$" and "$\Sigma$" respectively represent an average and dispersion of a likelihood of the target data. "d" represents a dimension number of the reconfiguration vector. "thres.2" represents a threshold value for determining a boundary between normal and abnormal.

As another example, the selection unit 245 may presume the distribution model as the mixture Gaussian distribution and calculate a likelihood P (r|θ) instead of the abnormal degree of the reconfiguration vector. Further, the selection unit 245 may select the minority data based on the likelihood. More specifically, the selection unit 245 selects the target data corresponding to the reconfiguration vector r which does not satisfy (Formula 6) as the minority data.

$$p(r|\theta) = \sum_{k=1}^{k=K_{GMM}} \pi_k N\left(r | \mu_k, \sum_k\right) > \text{thres. 3} \quad [\text{Formula 6}]$$

In (Formula 6), $\theta_k = \{\pi_k, \mu_k, \Sigma_k\}$, $\theta = \{\theta_k\}$, and {k=1, 2, ..., KGMM} represent parameters of the mixture Gaussian distribution, and "thres.3" represents a threshold value for determining a boundary between normal and abnormal. As described above, the selection unit 245 may use the likelihood instead of the abnormal degree as an index value of the degree of matching of the corresponding data with the dictionary. As further another example, the selection unit 245 may use a reciprocal of the likelihood as the abnormal degree.

As described above, the staged processing unit 240 generates a normal model of the reconfiguration information, determines a range of the minority data by threshold value processing on a likelihood and an abnormal degree (a deviation degree) with respect to the normal model, and selects data belonging to the determined range as the minority data. Processing a deviation degree and a likelihood by the threshold value can be expressed by a sign function. The deviation degree and the likelihood after conversion are regarded as matching degrees with the dictionary.

As another example, the reconfiguration information may be in one dimension, and in this case, the staged processing unit 240 may select the minority data by the threshold value processing on the reconfiguration information without generating the distribution model. For example, the selection unit 245 may set the top n % or the top n positions in descending order of projection error as the threshold value and select patches in the top n % or the top n positions as the minority data. In this case, the selection unit 245 may set the value n as the threshold value in response to a user operation. In addition, the selection unit 245 may determine a normal range by minority area selection in response to a user operation according to a second exemplary embodiment described below and select data out of the normal range as the minority data.

As described above, according to the present exemplary embodiment, the selection unit 245 calculates a projection error from the reconfiguration vector of the reconfiguration information and selects the minority data based on the distribution model of the projection error. The processing by the selection unit 245 is processing for selecting data based on the reconfiguration information, processing for selecting data based on the projection error, and processing for selecting data based on the distribution model of the projection error. All of the reconfiguration information, the reconfiguration vector, the projection error, and the distribution model are examples of information indicating the degree of matching of data with the dictionary.

Next, in step S308, the new data set reading unit 250 obtains the minority data selected in step S305 and reads the minority data into the new data set storage unit 251 as a new data set. Subsequently, the dictionary generation unit 231 regards the new data set as the target data set and generates a new dictionary using the target data set. The processing for generating the dictionary based on the target data set is similar to the processing for generating the first stage dictionary described in step S301. If only the first stage dictionary is generated at the processing timing, the dictionary generated in step S308 is a second stage dictionary. Subsequently, the staged dictionary is generated as a third stage, a fourth stage, and so on by repeating the processing in steps S303 to S309. The processing in step S308 is an example of the dictionary generation processing.

Next, in step S309, the completion determination unit 233 performs completion determination of the dictionary generation processing. When determining to complete the processing (YES in step S309), the completion determination unit 233 advances the processing to step S310. When not determining to complete the processing (NO in step S309), the completion determination unit 233 advances the processing to step S303. By the present processing, the selection processing of the minority data and the dictionary generation processing are repeated. In other words, the present processing is an example of repeat processing.

The completion determination unit 233 preforms quality determination on the verification image using the generated staged dictionary and determines whether to complete the dictionary generation according to the determination result. More specifically, the completion determination unit 233 uses respective captured images of an object known as a good quality piece and an object known as a defective piece as the verification images. Subsequently, the completion determination unit 233 performs the quality determination based on a matching degree with the dictionary and determines to complete the dictionary generation when a ratio of correctly determining the good quality piece in the true good quality pieces exceeds a certain threshold value. The present processing is similar to the processing in step S302.

As another example, the completion determination unit 233 may plot a change curve having the number of stages as a horizontal axis and the average reconfiguration error of the target data set as a vertical axis and determine to complete the processing when the change in the curve becomes gentle. As another example, the completion determination unit 233 may determine to complete the processing when a separation degree between a patch in a normal area and a patch in a defect area becomes a highest. As further another example, the completion determination unit 233 may determine to complete the processing when the dictionaries are generated in a predetermined number of stages.

In step S310, the output processing unit 260 performs control to output information pieces such as the generated dictionaries (the staged dictionaries), the distribution model of each dictionary, and the normal range of the distribution model as learning results. Thus, the staged dictionary generation processing is completed.

As described above, the information processing apparatus 110 according to the present exemplary embodiment generates a distribution model of each projection error using a plurality of data pieces actually used in generation of a dictionary, determines a threshold value according to the distribution model, and selects minority data. Therefore, the information processing apparatus 110 can select more appropriate data as the minority data compared to a case in which a distribution model of a projection error is theoretically assumed and then a threshold value thereof is determined. Accordingly, the information processing apparatus 110 can generate a dictionary suitable for a feature of data to be an evaluation target of a likelihood of belonging to a specific category.

Figure 4:
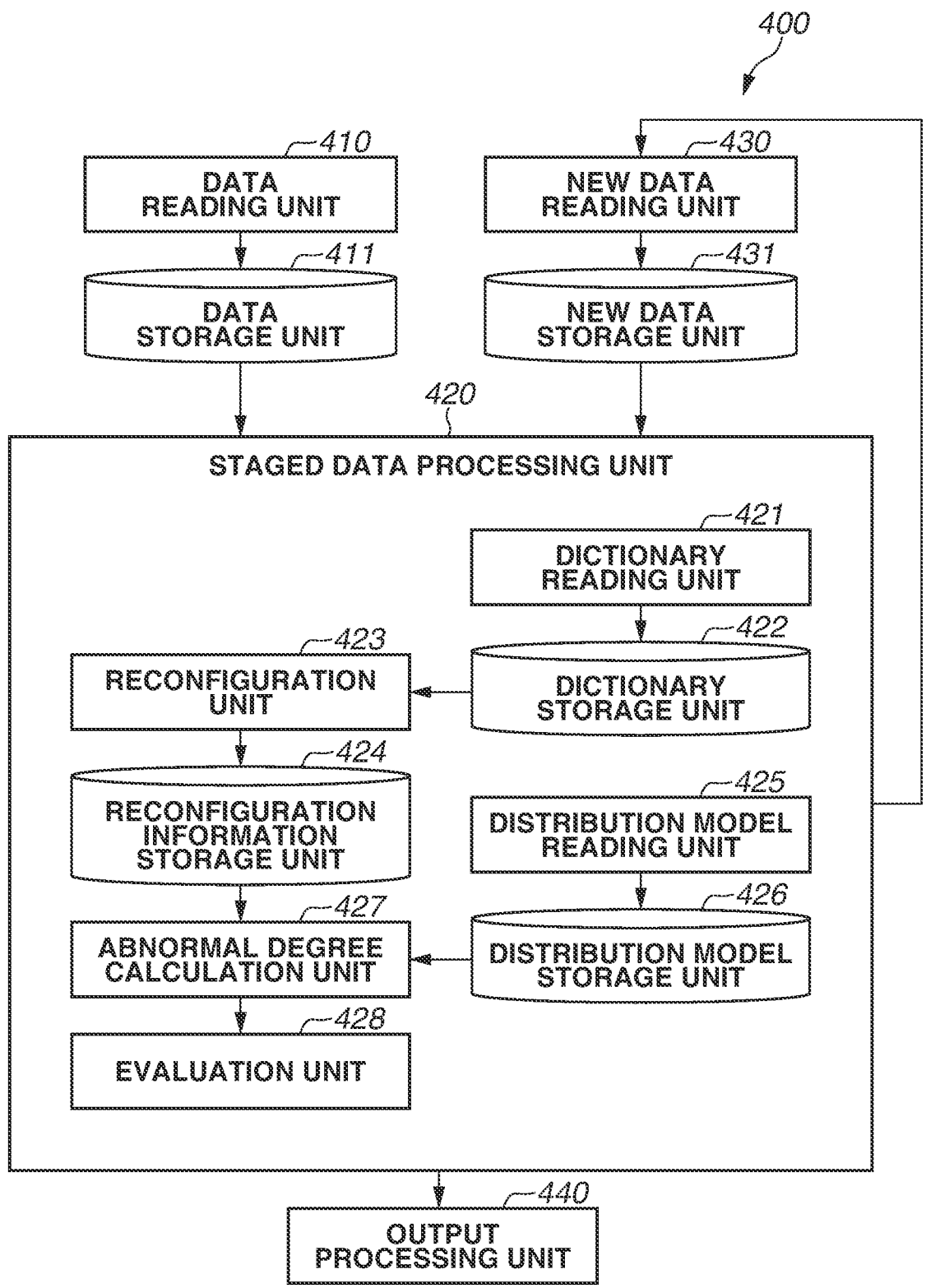
FIG. 4 illustrates a software configuration of a processing unit for performing evaluation processing.
Figure 5:
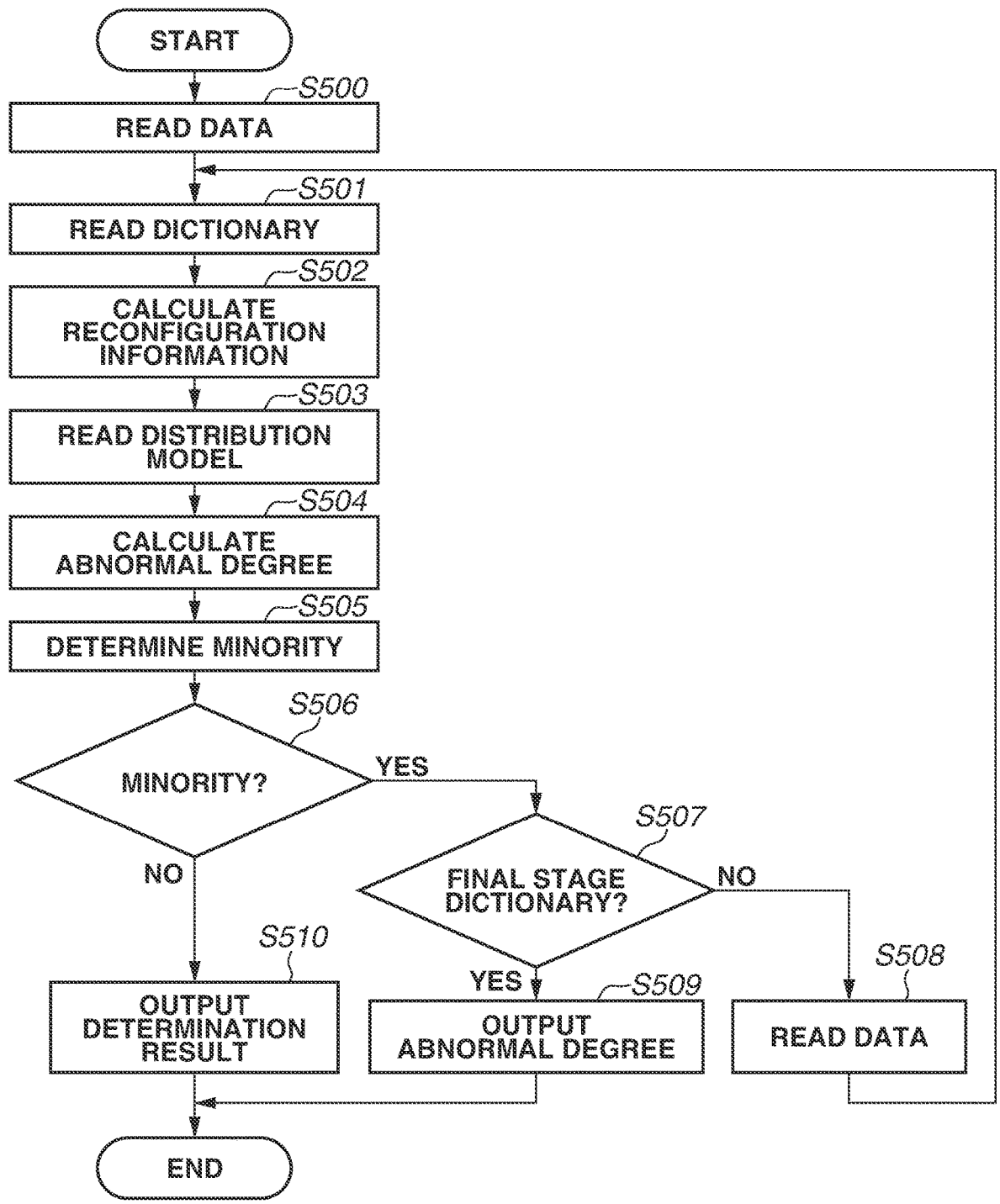
FIG. 5 is a flowchart illustrating evaluation processing.

Next, the evaluation processing by the information processing apparatus 110 is described. FIG. 4 illustrates a software configuration of a processing unit 400 related to the evaluation processing by the information processing apparatus 110. FIG. 5 is a flowchart illustrating the evaluation processing. As illustrated in FIG. 4, the processing unit 400 includes a data reading unit 410, a data storage unit 411, a staged data processing unit 420, a new data reading unit 430, a new data storage unit 431, and an output processing unit 440. The staged data processing unit 420 includes a dictionary reading unit 421, a dictionary storage unit 422, a reconfiguration unit 423, a reconfiguration information storage unit 424, a distribution model reading unit 425, a distribution model storage unit 426, an abnormal degree calculation unit 427, and an evaluation unit 428. A function of each unit is described along with the evaluation processing (FIG. 5).

In step S500 in FIG. 5, the data reading unit 410 obtains data to be a determination target and reads the data into the data storage unit 411. The data to be the determination target is patch data obtained from a captured image of an object which is unknown whether a good quality piece or not. The data reading unit 410 generates a patch using the sampling method similar to that described in the processing in step S300 in FIG. 3. Hereinbelow, data as a determination target is referred to as target data.

Processing in subsequent steps S501 to S507 is processing for reconfiguring the target data using a plurality of dictionaries generated in stages. In step S501, the dictionary reading unit 421 reads the dictionary generated in the dictionary generation processing (FIG. 3) into the online dictionary storage unit 422. The processing in step S501 is repeatedly executed, and the dictionary reading unit 421 reads the first stage dictionary generated in step S301 when the processing in step S501 is executed for the first time in response to the generation of the staged dictionary. Further, the dictionary reading unit 421 reads the dictionaries in the order of stage such as the second stage dictionary and the third stage dictionary according to a repeat count of the processing in step S501 (loop processing from step S501 to step S507). Hereinbelow, the dictionary read in step S501 is referred to as a target dictionary.

Next, in step S502, the reconfiguration unit 423 reconfigures the target data using the target dictionary and calculates the reconfiguration information. The processing for calculating the reconfiguration information from the target data is similar to the processing described in step S303. Next, in step S503, the distribution model reading unit 425 reads a distribution model corresponding to the target dictionary into the distribution model storage unit 426. The distribution model read in this step is the distribution model which is generated in step S304 with respect to the target dictionary. Hereinbelow, the distribution model read in step S503 is referred to as a target distribution model. Next, in step S504, the abnormal degree calculation unit 427 calculates an abnormal degree of the target data to the target dictionary based on the reconfiguration information calculated in step S502. The processing for calculating the abnormal degree is similar to the processing described in step S306. As described above, the information processing apparatus 110 according to the present exemplary embodiment also uses the abnormal degree in quality determination of the target data.

Next, in step S505, the evaluation unit 428 performs minority determination of whether the target data is within the normal range based on the abnormal degree. The normal range is a rage set to the distribution model in step S305. The evaluation unit 428 determines the target data as minority when the target data is not included in the normal range. When determining as minority (YES in step S506), the evaluation unit 428 advances the processing to step S507. When not determining as minority (NO in step S506), the evaluation unit 428 advances the processing to step S510. In step S510, the evaluation unit 428 determines the target data as normal data. Further, the output processing unit 440 performs control to output a normal determination result as an evaluation result. Thus, the evaluation processing is completed.

On the other hand, in step S507, the evaluation unit 428 confirms whether the target dictionary is a final stage dictionary. When the target dictionary is not the final stage dictionary (NO in step S507), the evaluation unit 428 advances the processing to step S508. When the target dictionary is the final stage dictionary (YES in step S507), the evaluation unit 428 advances the processing to step S509. In step S508, the evaluation unit 428 clears the abnormal degree. Further, the new data reading unit 430 reads the data handled as the processing target up until then into the new data storage unit 431 so as to set the data as the target data again. Subsequently, the new data reading unit 430 advances the processing to step S501. In this case, in step S501, the dictionary reading unit 421 reads a next stage dictionary and performs the subsequent processing. In step S509, the output processing unit 440 performs control to output the abnormal degree obtained with respect to the final stage dictionary as the evaluation result. Thus, the evaluation processing is completed. The processing in steps S509 and S510 is an example of the evaluation processing for evaluating a likelihood that the target data belongs to the specific category.

As another example, the output processing unit 440 may perform control to output the abnormal degree as an index corresponding to the likelihood of belonging to the specific category instead of the normal determination result in step S510. As further another example, the output processing unit 440 may output a comprehensive evaluation result corresponding to an evaluation result of each of a plurality of patches constituting a captured image instead of or in addition to the above-described evaluation result.

As described above, the information processing apparatus 110 according to the present exemplary embodiment generates the dictionary which excessively detects data, roughly determines the learning data, and determines the data again by the next stage dictionary. Accordingly, the information processing apparatus 110 can asymptotically calculate a boundary between the minority data belonging to the specific category and data not belonging to the specific category which is difficult to be determined.

The information processing apparatus 110 according to the present exemplary embodiment can select appropriate minority data according to a matching degree of data used in the dictionary generation with the dictionary. Accordingly, the information processing apparatus 110 can generate an appropriate dictionary which has a high expression ability of minority data while preventing reduction of an expression ability of majority data.

As a first modification of the first exemplary embodiment, the information processing apparatus 110 may select a minority area including a peripheral patch of a minority patch as minority data. For example, the information processing apparatus 110 regards the minority data selected by the processing described in the present exemplary embodiment as a minority data candidate. Further, the information processing apparatus 110 generates a projection error map based on position information on an image and a projection error of the distribution model of the target data selected as the minority data candidate. Subsequently, the information processing apparatus 110 may search the map for a noticeable area as the minority area, determine the normal range and a minority range again using a maximum value and an average value of the projection error in the area as threshold values, and select the minority data. By the above-described processing, the information processing apparatus 110 can obtain an abnormal area in a macro range of, for example, 300*300 pixels by referring to the peripheral area by the area search instead of a micro range of 8*8 pixels. In this case, a user can instinctively understand an effect of the processing apparatus by an application and the like which presents an abnormal candidate area to the user.

As a second modification, the dictionary generation processing and the evaluation processing may be executed in different apparatuses. For example, a first information processing apparatus performs the dictionary generation processing and transmits information pieces such as generated staged dictionaries and distribution models of the respective dictionaries to a second information processing apparatus. Further, the second information processing apparatus performs the evaluation processing on the data.

As a third modification, the information processing apparatus 110 may select minority data based on the reconfiguration information, and specific processing for the selection is not limited to that in the present exemplary embodiment. For example, when the reconfiguration information is in one dimension as described above, the information processing apparatus 110 may select a predetermined number or a predetermined ratio of data pieces having a higher deviation degree to the dictionary as the minority data in descending order of value indicated by the reconfiguration information. In other words, in this case, calculation of the projection error, generation of the distribution model, and calculation of the abnormal degree (or the deviation degree) are not necessary.

In addition, the information processing apparatus 110 may select the minority data based on the information indicating the degree of matching, and the information indicating the degree of matching to be used here is not limited to the reconfiguration information, the projection error, and the abnormal degree (or the deviation degree). The information indicating the degree of matching may be information indicating a value which can evaluate the deviation degree or the similarity to the dictionary. Further, the information processing apparatus 110 may use a value indicating the degree of matching to an index value used for generating the distribution model without being limited to the projection error. In other words, the information processing apparatus 110 may select the minority data based on a distribution of the information indicating the degree of matching, and the specific processing for the selection is not limited to that in the present exemplary embodiment.

Next, an inspection system 100 according to a second exemplary embodiment is described. When a normal range is set widely, a ratio of majority data to be determined as normal increases, and an efficiency of minority learning is reduced. On the other hand, when the normal range is narrowed, there is a possibility that normal data to be relearned is missed. Thus, a method is required for determining an appropriate threshold value for setting a boundary between a normal range and an abnormal range. A purpose of the minority learning is to distinguish data having a high abnormal degree in normal data and data having a low abnormal degree in defect data. When this point is focused, it is desirable that data having a minimum abnormal degree in the defect data is identified, and minority data is selected using a neighborhood value of the abnormal degree of the identified data as a boundary. The minority data thus selected is used, and accordingly the dictionary can be generated of which a boundary between the defect data and the normal data is highly accurate.

Figure 6:
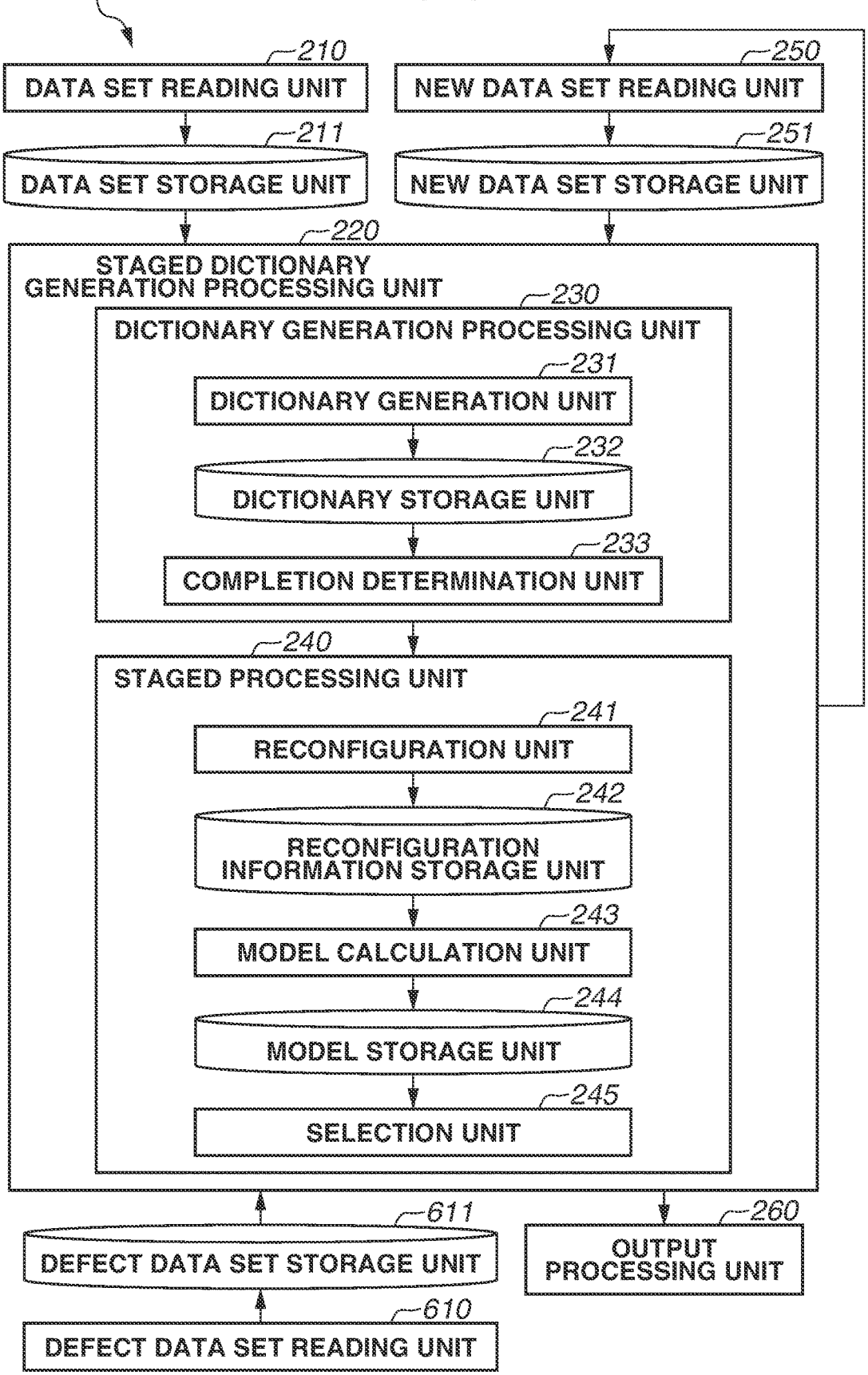
FIG. 6 illustrates a software configuration of a processing unit according to a second exemplary embodiment.
Figure 7:
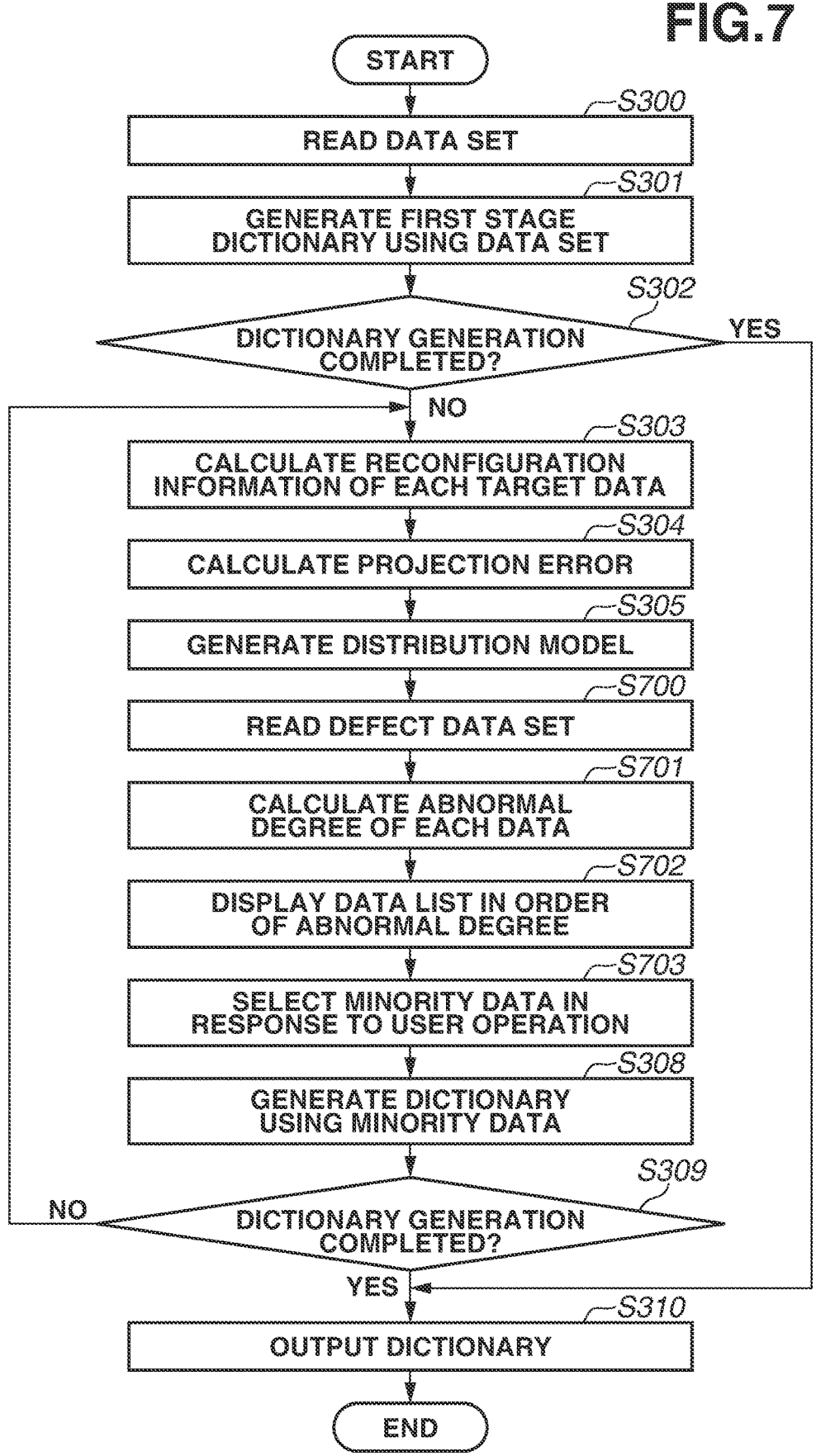
FIG. 7 is a flowchart illustrating dictionary generation processing according to the second exemplary embodiment.

Hereinbelow, a different point of the inspection system 100 according to the second exemplary embodiment from the inspection system 100 according to the first exemplary embodiment is described. FIG. 6 illustrates a software configuration of a processing unit 600 related to dictionary generation processing by the information processing apparatus 110 according to the second exemplary embodiment. FIG. 7 is a flowchart illustrating the dictionary generation processing according to the second exemplary embodiment. As illustrated in FIG. 6, the processing unit 600 includes a defect data set reading unit 610 and a defect data set storage unit 611 in addition to the configuration of the processing unit 200 (FIG. 2) according to the first exemplary embodiment. A function of each unit is described along with the dictionary generation processing (FIG. 7).

Regarding FIG. 7, each processing similar to that in the dictionary generation processing described with reference to FIG. 3 is denoted with the same reference number, and the description thereof is omitted. After the processing in step S305, the CPU 111 advances the processing to step S700. In step S700, the defect data set reading unit 610 reads a defect image data set into the defect data set storage unit 611. The defect image data set is a set of patch data pieces obtained from a defect image. The defect data set reading unit 610 generates a patch using the sampling method similar to that described in the processing in step S300 in FIG. 3.

Next, in step S701, the staged processing unit 240 calculates the reconfiguration information of each data in the defect image data set with respect to the target dictionary, calculates the projection error from the reconfiguration information, and further calculates the abnormal degree. The present processing is similar to the processing described in steps S303 to S306. Next, in step S702, the output processing unit 260 ranks a plurality of data pieces in the defect image data set based on the abnormal degree. The abnormal degree is information indicating the degree of matching of the data to the dictionary, and the present processing is an example of ranking processing. The output processing unit 260 controls the display apparatus 130 to display a data list in which a plurality of data pieces arranged in order of rank. The present processing is an example of display processing. Next, in step S703, the selection unit 245 selects data selected by a user operation as minority data.

Figure 8:
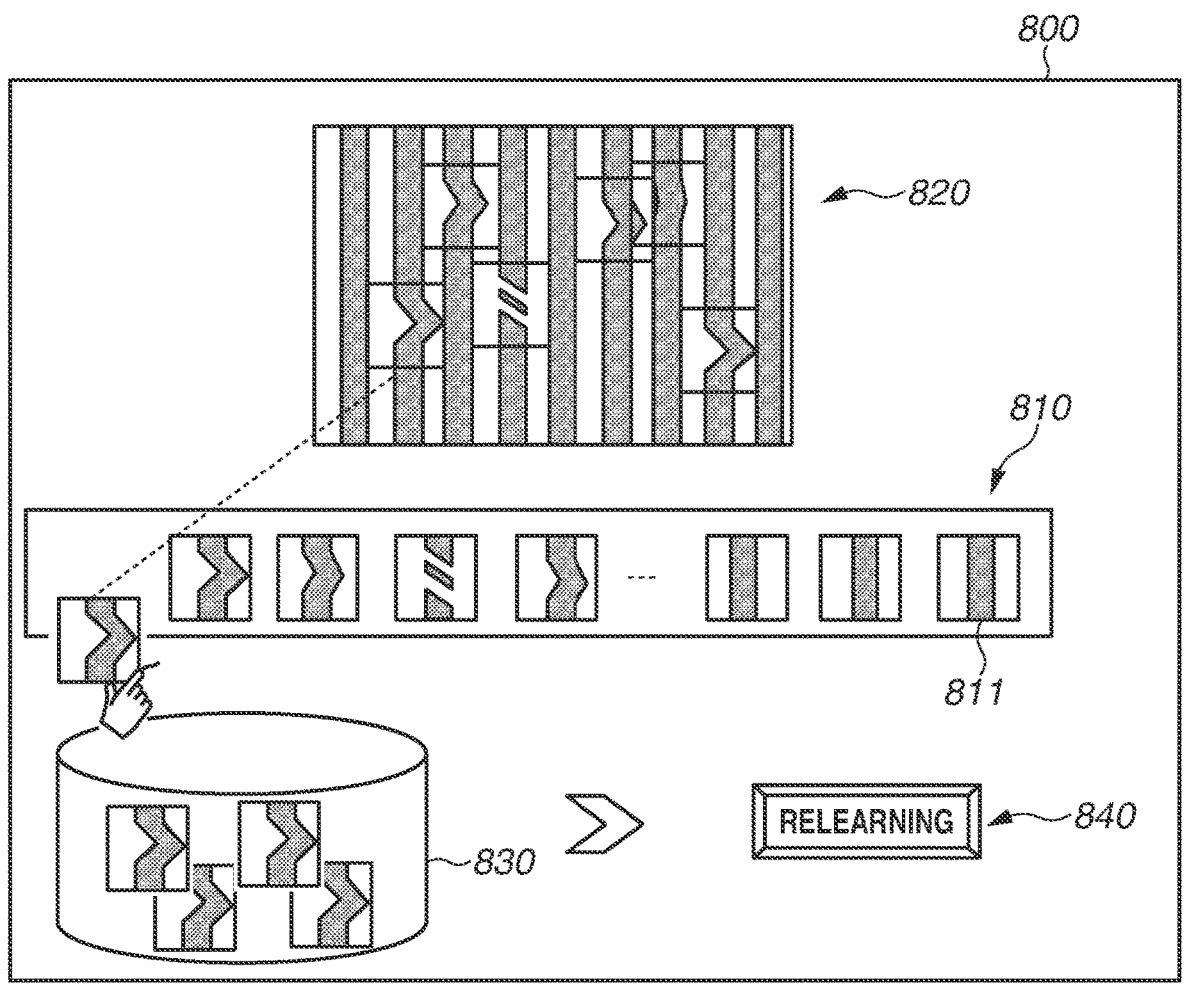
FIG. 8 illustrates an example of a display screen.

FIG. 8 illustrates an example of a display screen displayed on the display apparatus 130 at the time point of the processing in step S702. A data list 810 is displayed on a display screen 800. In the data list 810, each data 811 included in the defect image data set is displayed in the order of abnormal degree. Further, an original image (a defect image) 820 corresponding to the defect data set is displayed on the display screen 800.

A user visually confirms each data (an image) displayed in the data list 810. Further, the user selects an image (data) which is an image indicating a normal state but indicates an abnormal degree higher than that of an image indicating an obvious defect as relearning target data, namely the minority data. When the user selects the data 811 in the data list 810, the selected data is transferred to an area 830 of the relearning data. In addition, the output processing unit 260 performs control to highlight an area in the original image 820 corresponding to the data selected by the user operation. When the user presses a relearning button 840, the selection unit 245 selects the data transferred to the area 830 as the minority data.

According to the present exemplary embodiment, not only the data list 810 but also the original image 820 are displayed, so that the user can correctly determine whether each data is abnormal data or normal data. In this regard, it is desirable that the minority data is selected to narrow the normal range so as not to miss a defect having a low abnormal degree.

Returning to FIG. 7, after the processing in step S702, the CPU 111 advances the processing to step S308. In step S308, the new data set reading unit 250 obtains the minority data selected in step S703 and reads as a new data set into the new data set storage unit 251. Subsequently, the dictionary generation unit 231 regards the new data set as the target data set and generates a new dictionary using the target data set. Other configuration and processing in the information processing apparatus 110 according to the second exemplary embodiment are similar to the configuration and the processing in the information processing apparatus 110 according to the first exemplary embodiment.

As described above, according to the second exemplary embodiment, the threshold value is set by a user operation by a comparison with the data not belonging to the specific category focusing on that the minority data is data difficult to be distinguished from the data not belonging to the specific category. As described above, the threshold value can be set flexibly.

As a first modification of the second exemplary embodiment, after selecting normal minority data (minority data) from the defect image by the above-described processing, the selection unit 245 may further add the normal minority data (minority data) from the defect image and an image of a good quality piece. This processing is effective when the number of the defect images is small.

More specifically, the selection unit 245 calculates a distribution ($\mu(A_{minor})$, $\sigma(A_{minor})$) of an abnormal degree $A_{minor}$ of the selected minority data. The selection unit 245 also calculates a minimum value $\min(A_{defect})$ of the abnormal degree regarding all defect areas clipped from the defect image. Further, the selection unit 245 determines a threshold value for determining a normal minority range using min ($\min(A_{defect})$, ($\mu(A_{minor})-n*\sigma(A_{minor})$)). Here, "n" represents a parameter for controlling fine adjustment of the threshold value. An adjustment bar for adjusting the n value may be added on the display screen. In this case, after the user selects the minority data, the minority is determined by a default n, and the updated minority data is highlighted in the data list 810. The user adjusts the n value via the adjustment bar, and thus a ratio thereof can be changed.

As processing for adding the minority data, the information processing apparatus 110 may extract a feature such as the reconfiguration information from the area and select a plurality of unselected areas near each selected area by k-nearest neighbor algorithm and the like. Further, the information processing apparatus 110 may record the threshold value determined by the above-described method as the threshold value of the normal range of the distribution model and determine the minority data with reference to the recorded threshold value in the determination.

As a second modification, the information processing apparatus 110 may further select the minority data based on information of a defect position. For example, the information processing apparatus 110 may obtain information indicating a defect position in the defect image. Further, the information processing apparatus 110 may automatically determine whether the minority data or not according to whether the minority data selected by a user operation overlaps the defect position and select only the minority data. Furthermore, the information processing apparatus 110 may determine the threshold value for when evaluating data according to the defect position.

Figure 9:
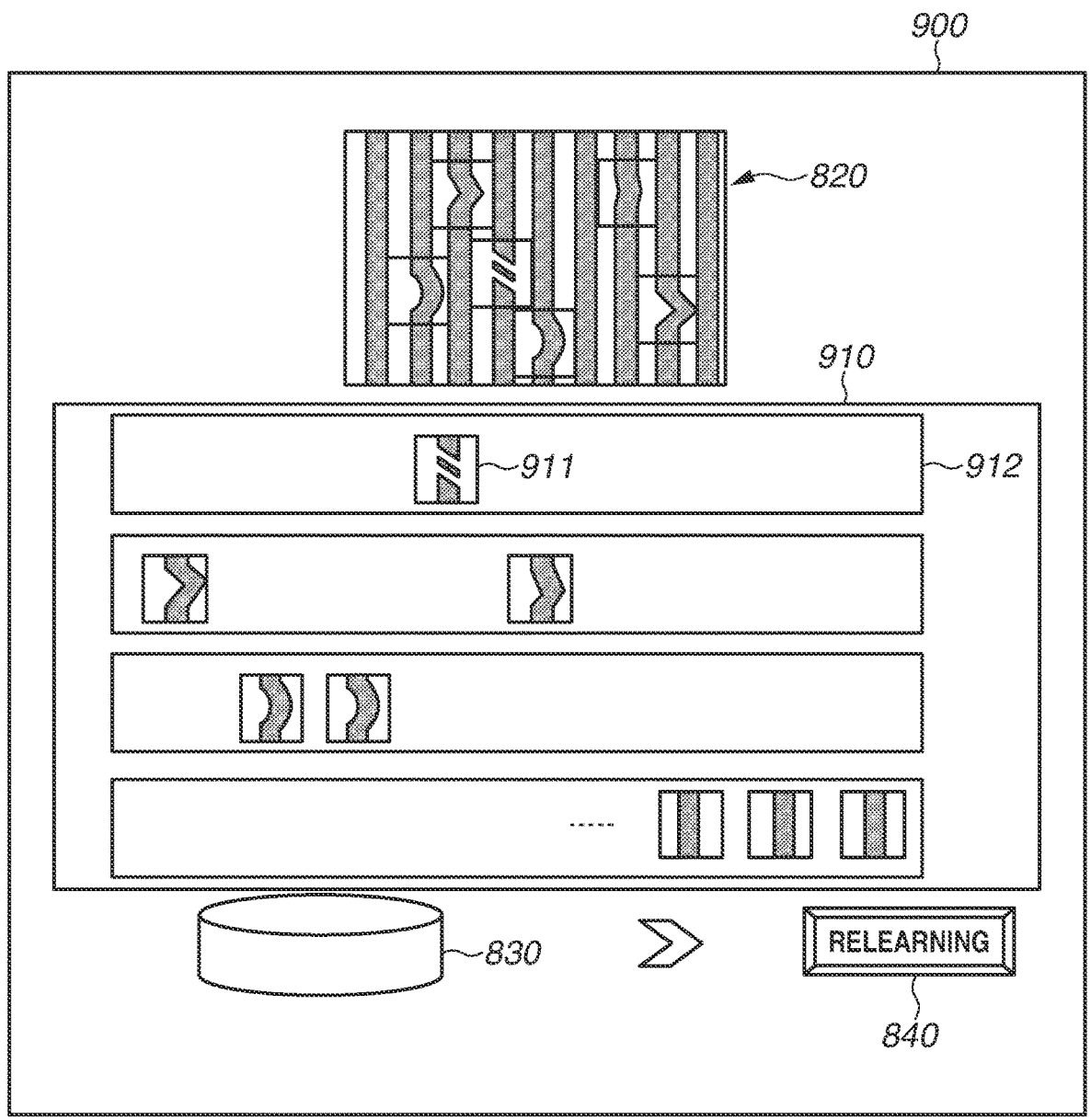
FIG. 9 illustrates an example of a display screen according to a modification.

As a third modification, when there is a plurality of minority patterns, the information processing apparatus 110 may display each minority pattern by grouping or clustering. The information processing apparatus 110 performs grouping based on, for example, the reconfiguration information in the previous stage dictionary. FIG. 9 illustrates an example of a display screen according to the third modification. A defect data list 910 is displayed on a display screen 900. In the defect data list 910, lists 912 of each group are arranged, and defect data 911 is arranged in each list 912. It is desirable that right and left positions of each list match with right and left positions of the data list 810 in the display screen 800. In addition, the original image 820, the area 830, and the relearning button 840 are displayed on the display screen 900.

For example, there is a case that two types of minority are included in the original image 820 illustrated in FIG. 9. As described above, when there is a plurality of minority types, a user may require a long time to determine whether minority or defect. In addition, a defect having a low abnormal degree is likely to be missed. Thus, according to the present modification, the information processing apparatus 110 displays not only ranked data pieces in a line but also a representative pattern selected from grouped similar minority patterns. Accordingly, many similar patterns are not displayed, and an efficiency can be improved when a user selects data.

As a fourth modification, the information processing apparatus 110 may rank data according to a value of a projection error without generating the distribution model. More specifically, when the dictionary is generated (in step S301 or step S308), the information processing apparatus 110 calculates a projection error of each data in the defect data set with respect to the generated dictionary and ranks the data according to the value of the projection error. In this case, the information processing apparatus 110 can appropriately rank data corresponding to the degree of matching with the dictionary.

As a fifth modification, the information processing apparatus 110 may rank data based on the information indicating a degree of matching, and specific processing for ranking is not limited to that in the present exemplary embodiment. According to the second exemplary embodiment, the example is described in which the projection error is used as the information indicating the degree of matching, however, the information indicating the degree of matching is not limited to the projection error, and another index value obtained from the reconfiguration information may be used. As another example, the information processing apparatus 110 may use information other than the reconfiguration information as the information indicating the degree of matching.

Next, an inspection system 100 according to a third exemplary embodiment is described. According to the first and the second exemplary embodiments, the information processing apparatus 110 selects minority data according to an abnormal degree (a likelihood), however, an information processing apparatus 110 according to the present exemplary embodiment generates a staged dictionary by adding a weight corresponding to an abnormal degree (a likelihood) to each data.

The information processing apparatus 110 according to the present exemplary embodiment generates a small-scale dictionary candidate by dividing a large-scale dictionary and generates a staged dictionary from the dictionary candidate. In addition, in the evaluation processing, the information processing apparatus 110 according to the present exemplary embodiment calculates an abnormal degree (a likelihood) of evaluation target data with respect to each of a plurality of staged dictionaries and evaluates the likelihood that the data is normal data (belongs to the specific category) based on the abnormal degree of each of the plurality of dictionaries.

Figure 10:
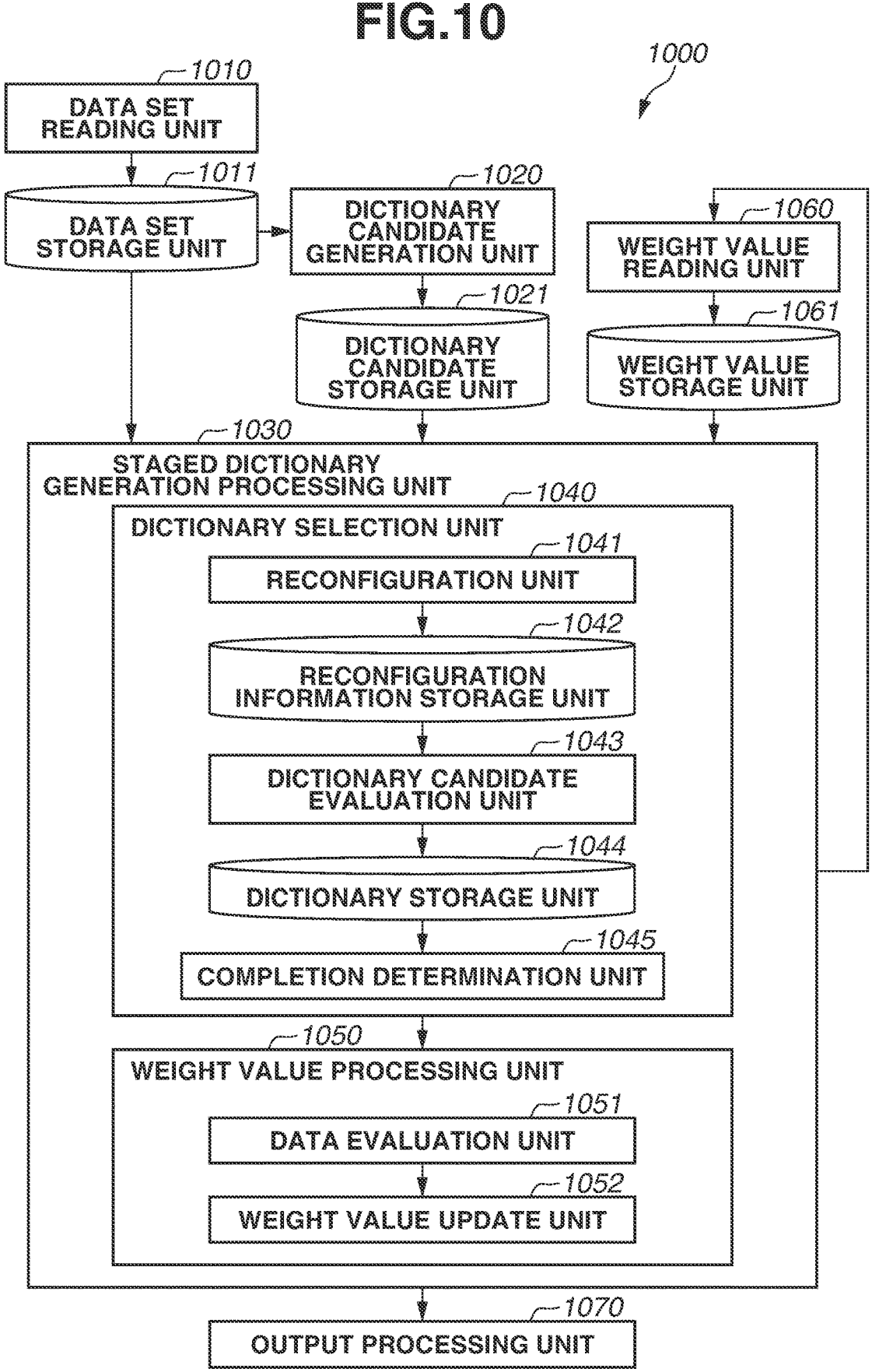
FIG. 10 illustrates a software configuration of a processing unit according to a third exemplary embodiment.
Figure 11:
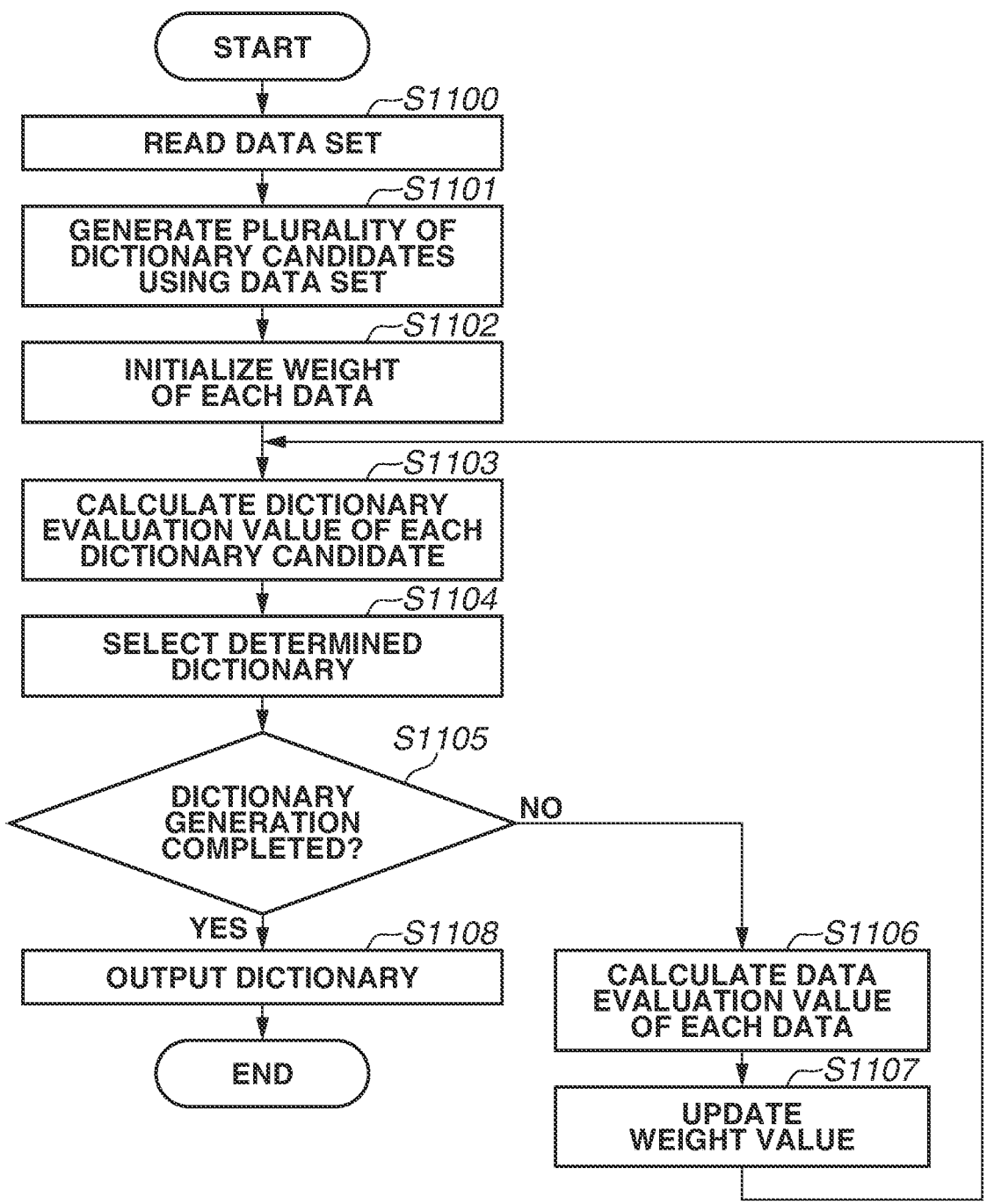
FIG. 11 is a flowchart illustrating dictionary generation processing according to the third exemplary embodiment.

Hereinbelow, a different point of the inspection system 100 according to the third exemplary embodiment from the inspection system 100 according to the other exemplary embodiments is described. FIG. 10 illustrates a software configuration of a processing unit 1000 related to dictionary generation processing by the information processing apparatus 110 according to the third exemplary embodiment. FIG. 11 is a flowchart illustrating the dictionary generation processing according to the third exemplary embodiment. As illustrated in FIG. 10, the processing unit 1000 includes a data set reading unit 1010, a data set storage unit 1011, a dictionary candidate generation unit 1020, a dictionary candidate storage unit 1021, and a staged dictionary generation processing unit 1030. The processing unit 1000 further includes a weight value reading unit 1060, a weight value storage unit 1061, and an output processing unit 1070. The staged dictionary generation processing unit 1030 includes a dictionary selection unit 1040 and a weight value processing unit 1050. The dictionary selection unit 1040 includes a reconfiguration unit 1041, a reconfiguration information storage unit 1042, a dictionary candidate evaluation unit 1043, a dictionary storage unit 1044, and a completion determination unit 1045. The weight value processing unit 1050 includes a data evaluation unit 1051 and a weight value update unit 1052. A function of each unit is described along with the dictionary generation processing (FIG. 11).

In step S1100 in FIG. 11, the data set reading unit 1010 obtains a data set for learning and reads the data set into the data set storage unit 1011. The present processing is similar to the processing in step S300 described with reference to FIG. 3. Next, in step S1101, the dictionary candidate generation unit 1020 generates a plurality of dictionary candidates using the data set and records the dictionary candidates in the dictionary candidate storage unit 1021. More specifically, the dictionary candidate generation unit 1020 generates a single large-scale dictionary using the data set and divides the dictionary into a plurality of small-scale dictionaries. The dictionary candidate generation unit 1020 records the small-scale dictionaries obtained by the division as the dictionary candidates in the dictionary candidate storage unit 1021. The dictionary candidate generation unit 1020 generates the large-scale dictionary, for example, by the method similar to the processing in step S301 in FIG. 3. In order to guarantee coverage of the dictionary candidates, it is desirable to use more pieces K0 of the reference data, in other words to generate excessively equipped dictionary. Next, the dictionary candidate generation unit 1020 randomly divides the reference data pieces into M pieces of groups and obtains the reference data pieces belonging to each group as the dictionary candidates. According to the present exemplary embodiment, the dictionary candidate generation unit 1020 sets K0=256 and M=256 and generates the dictionary candidate in which the number of the reference data pieces is one.

As another example, the dictionary candidate generation unit 1020 may use a clustering method such as K-means clustering when dividing the reference data pieces into groups. As further another example, a user may specify data having a difference characteristic, and the dictionary candidate generation unit 1020 may perform grouping according to the reference data set corresponding to the area specified by the user. In this case, the dictionary candidate can be generated which can capture a minute change in the group and a significant change between the groups. As another example, the dictionary candidate generation unit 1020 may perform grouping based on a frequency at which the reference data and a reference data pair are referred to.

Next, in step S1102, the weight value reading unit 1060 records an initial value as a weight value corresponding to each data included in the data set in the weight value storage unit 1061. The weight value is an evaluation value indicating a degree that each data contributes to the dictionary candidate to be an evaluation target when the dictionary candidate is evaluated. According to the present exemplary embodiment, the weight value reading unit 1060 records an initial weight $w_i^{(0)}$ as 1. "i" represents i-th data in the data set. "0" in $w_i^{(0)}$ represents that a stage of the dictionary generation is "0".

Next, in step S1103, the dictionary selection unit 1040 calculates the evaluation value indicating a degree of matching with each data in an input data set weighted by the weight value of each of a plurality of the dictionary candidates. Hereinbelow, the evaluation value of the dictionary candidate to each data in the input data set is referred to as a dictionary evaluation value. According to the present exemplary embodiment, the dictionary evaluation value is a value obtained by integrating the evaluation values of the dictionary candidates corresponding to a plurality of data pieces included in input data set. In addition, the evaluation value of each data included in the input data set with respect to the dictionary (the dictionary candidate) is referred to as a data evaluation value. The processing in step S1103 is performed by the reconfiguration unit 1041 and the dictionary candidate evaluation unit 1043. In the present processing, either of two evaluation methods described below can be used.

(An evaluation method 1): This method is a relative evaluation method in which data is reconfigured once using all dictionary candidates, a sum total of contribution degrees of all dictionary candidates to the data is regarded as 1, and the dictionary candidate is evaluated from a ratio of the contribution degree of each dictionary candidate. More specifically, the reconfiguration unit 1041 reconfigures each data y using (Formula 1) and K0=M pieces of the reference data and records the reconfiguration information in the reconfiguration information storage unit 1042. Accordingly, reconfigured data can be expressed in a format as (Formula 7).

$$y'_i = Dx_i = \sum_{m=0}^{m=K_0-1} x_{im} * b_m \qquad \text{[Formula 7]}$$

In (Formula 7), "i" represents an index of input data, "m" represents an index of the dictionary candidate (the reference data). "$y_i$" represents reconfigured data, "D={$b_m$}, m=0, . . . , $K_{0-1}$" represents an excessively equipped dictionary, "$x_i$" represents a reconfiguration coefficient vector, "$b_m$" represents m-th reference data, and "$x_{im}$" represents a coefficient of the m-th reference data.

Next, the dictionary candidate evaluation unit 1043 calculates the dictionary evaluation value with respect to each dictionary candidate using (Formula 8).

$$V_m^{(t)} = \sum_{i=0}^{N-1} w_i^{(t)} * S_{im} \qquad \text{[Formula 8]}$$

In (Formula 8), "N" represents the number of input data pieces. "$V_m^{(t)}$" represents an evaluation value of the m-th dictionary candidate (the m-th reference data $b_m$) regarding t-th dictionary selection processing. "$w_i^{(t)}$" represents a weight value of i-th input data in t-th determined dictionary selection processing. "$S_{im}$" represents a similarity of the i-th input data and the m-th dictionary candidate (reference data) or a contribution degree of the m-th dictionary candidate (reference data) to the i-th input data. The similarity $S_{im}$ is obtained by (Formula 9).

$$S_{im} = \frac{|x_{im}|}{\|x_i\|_1} \qquad \text{[Formula 9]}$$

The similarity $S_{im}$ is not just a dot product of the m-th dictionary candidate (reference data) and the input data and the like, but based on the reconfiguration coefficient determined with reference to all reference data pieces by optimization of (Formula 1), so that the evaluation method is referred to as relative evaluation. The similarity $S_{im}$ does not change by the times t and thus can be calculated in advance.

(An evaluation method 2): This method is an absolute evaluation method in which data is reconfigured using each dictionary candidate, and the dictionary candidate having a best dictionary evaluation value is selected. When the dictionary candidate includes sufficient reference data pieces, for example, in the case of $K_0=256$ and $M=16$, such evaluation can be performed. More specifically, when the m-th dictionary candidate is calculated, the reconfiguration unit 1041 calculates an abnormal degree score $A_{im}$ using (Formula 4) to (Formula 6) and the like and records the abnormal degree score $A_{im}$ in the reconfiguration information storage unit 1042. Next, the dictionary candidate evaluation unit 1043 calculates the dictionary evaluation value using (Formula 8). However, in the present processing, (Formula 10) is used for calculation of the similarity $S_{im}$.

$$S_{im} = \frac{1}{A_{im}} \qquad \text{[Formula 10]}$$

The abnormal degree score $A_{im}$ is calculated when the i-th input data is approximated by the m-th generated dictionary candidate. The abnormal degree score $A_{im}$ can be calculated in advance.

Next, in step S1104, the dictionary candidate evaluation unit 1043 selects the dictionary from the dictionary candidates based on the dictionary evaluation value. In the present processing, a different selection method can be used according to the processing in step S1103.

(A selection method 1 (corresponding to the evaluation method 1)): The dictionary candidate evaluation unit 1043 selects a plurality of the reference data pieces and selects a set thereof as a determined dictionary. A case is described in which K' pieces of the reference data in the determined dictionary are selected. The dictionary candidate evaluation unit 1043 sorts the evaluation values $V_m^{(t)}$ in descending order regarding $K_0$ pieces of candidate reference data and selects K' pieces of the reference data of which the evaluation value is the highest. When a set of indices of all reference data pieces is regarded as "I", a set of indices of the selected reference data pieces is regarded as "$I_{k'}$", and a set of indices of the reference data pieces not selected is regarded as "$I_{k''}$", the determined dictionary is expressed by (Formula 11).

$$D^{(t)} = \{b_{k'}\}$$

$$V_{k'}^{(t)} \geq V_{k''}^{(t)}, k' \in I_{k'}, k'' \in I_{k''}$$

$$I = \{0, 1, \ldots, K_0-1\}, I = I_{k'} \cap I_{k''} \qquad \text{[Formula 11]}$$

In (Formula 11), "$D^{(t)}$" represents a t-th selected determined dictionary (a t-th stage determined dictionary).

(A selection method 2 (corresponding to the evaluation method 2)): The dictionary candidate evaluation unit 1043 selects one dictionary candidate as the determined dictionary. The dictionary candidate evaluation unit 1043 stores the dictionary candidate corresponding to a maximum value of the dictionary evaluation value in M pieces of the evaluation values $V_m^{(t)}$ as t-th determined dictionary in the dictionary storage unit 1044.

Next, in step S1105, the completion determination unit 1045 performs completion determination of the dictionary generation. The completion determination unit 1045 automatically sets a number of times T of the dictionary generation appropriate for the data set and determines that the dictionary generation is completed when the dictionary generation reaches the number of times T using a method similar to the processing in step S309 described with reference to FIG. 3 according to the first exemplary embodiment. A difference point from completion evaluation processing (in step S309) is a calculation method of an index value indicating the degree of matching with the final stage dictionary. In step S1105, the completion determination unit 1045 calculates the similarity to the staged dictionary as an index value using (Formula 15) described below. As another example, the number of times T of the dictionary generation may be set in advance. When determining to complete the processing (YES in step S1105), the completion determination unit 1045 advances the processing to step S1108. In step S1108, the output processing unit 1070 performs control to output the generated dictionary (the staged dictionary) as the learning result. When not determining to complete the processing (NO in step S1105), the completion determination unit 1045 advances the processing to step S1106.

In step S1106, the data evaluation unit 1051 calculates the data evaluation value of each data included in the data set with respect to the determined dictionary selected in step S1104. According to the present exemplary embodiment, the abnormal degree described according to the first exemplary embodiment is calculated as the data evaluation value.

Next, in step S1107, the weight value update unit 1052 calculates a weight value of data used in step S1103 when the next dictionary is selected based on the abnormal degree as the data evaluation value and updates the weight value stored in the weight value storage unit 1061 with the newly calculated weight value.

More specifically, the weight value update unit 1052 first calculates an average $\mu(A^{(t)})$ and a dispersion $\sigma(A^{(t)})$ of an abnormal degree $A^{(t)}$ to the t-th stage dictionary (determined dictionary) calculated in step S1106 and records them in the dictionary storage unit 1044. Next, the weight value update unit 1052 normalizes the abnormal degree by (Formula 12). The average of the abnormal degree is shifted to zero by the present processing.

$$\tilde{A}_i^{(t)} = \frac{A_i^{(t)} - \mu(A^{(t)})}{\sigma(A^{(t)})} \qquad \text{[Formula 12]}$$

Next, the weight value update unit 1052 updates the weight value by (Formula 13). In (Formula 13), a weight of t-th data is multiplied by a coefficient, however, the abnormal degree score is not multiplied as it is but abnormal degree score is normalized from zero to one by sigmoid function and multiplied as the coefficient. By this processing, the weight of data is guaranteed to be monotonously decreased as the number of times T increases.

$$w_i^{(t+1)} = w_i^{(t)} * \frac{1}{1 + e^{-\alpha * \tilde{A}_i^{(t)}}} \qquad \text{[Formula 13]}$$

In (Formula 13), "$w_i^{(t)}$" represents the weight value used in step S1103 executed immediately before the processing, in other words, the weight value used in generation of the determined dictionary which is generated immediately before. "$w_i^{(t+1)}$" represents the weight value used in step S1103 executed immediately after the processing. "$A_i^{(t)}$" represents the abnormal degree when the data i is approximated by the t-th selected dictionary (the t-th stage dictionary) and expresses a matching degree of the data i with the dictionary. "α" represents a gain which controls an intensity of a non-linear change.

The processing in step S1107 is an example of weighting processing for weighting data in response to the abnormal degree as the information indicating a degree of matching of each data to the dictionary candidate which is not selected as the dictionary at the time point when the n-th stage (n is an integer greater than or equal to 1) dictionary is selected. When the (n+1)-th stage dictionary is selected, the data weighted by the present processing is used.

As another example, according to the present exemplary embodiment, the information processing apparatus 110 may generate a distribution model of input data with respect to the generated dictionary and perform control to output the distribution model to the dictionary storage unit 1044 together with the dictionary.

Figure 12:
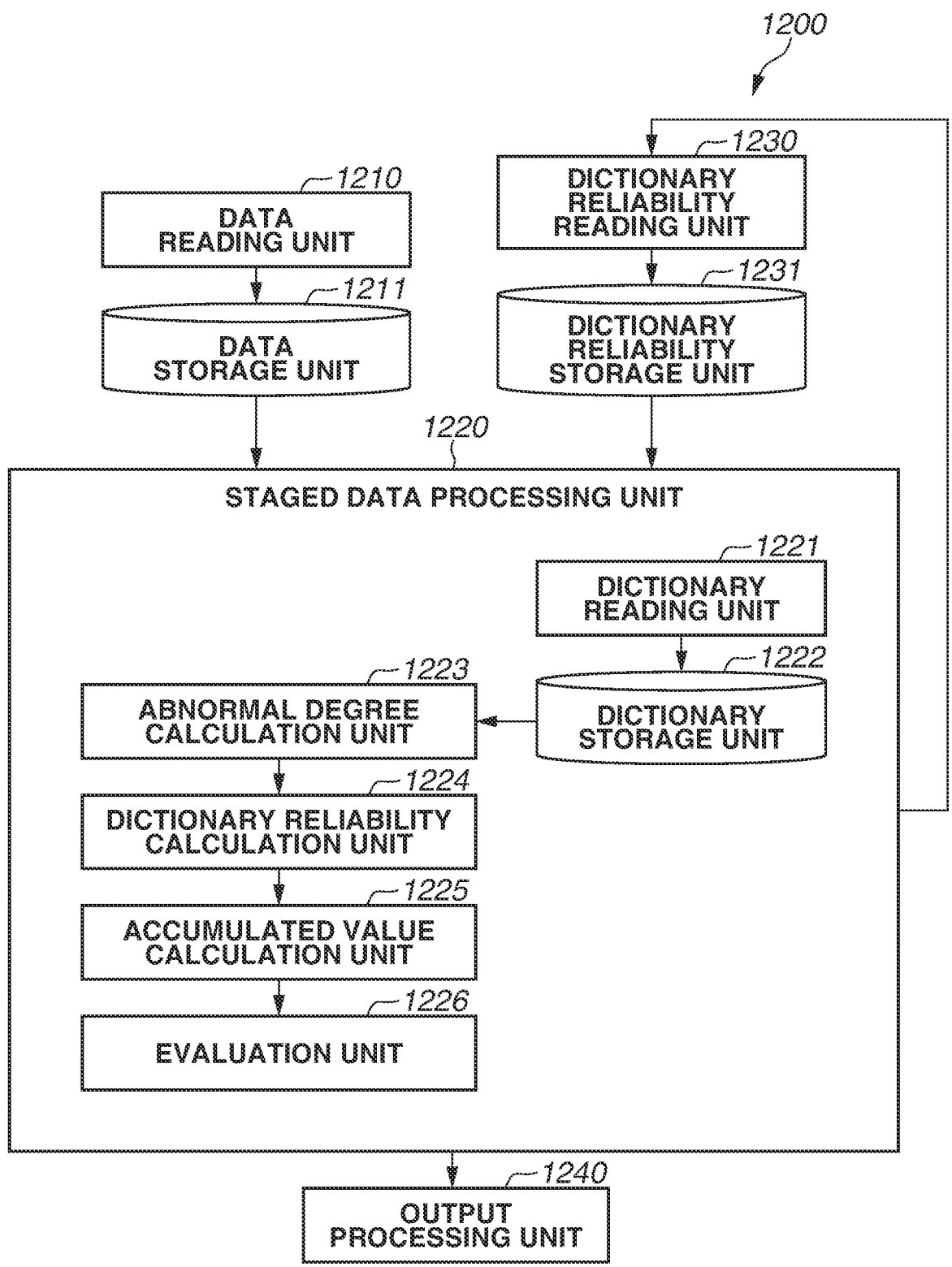
FIG. 12 illustrates a software configuration of a processing unit according to the third exemplary embodiment.
Figure 13:
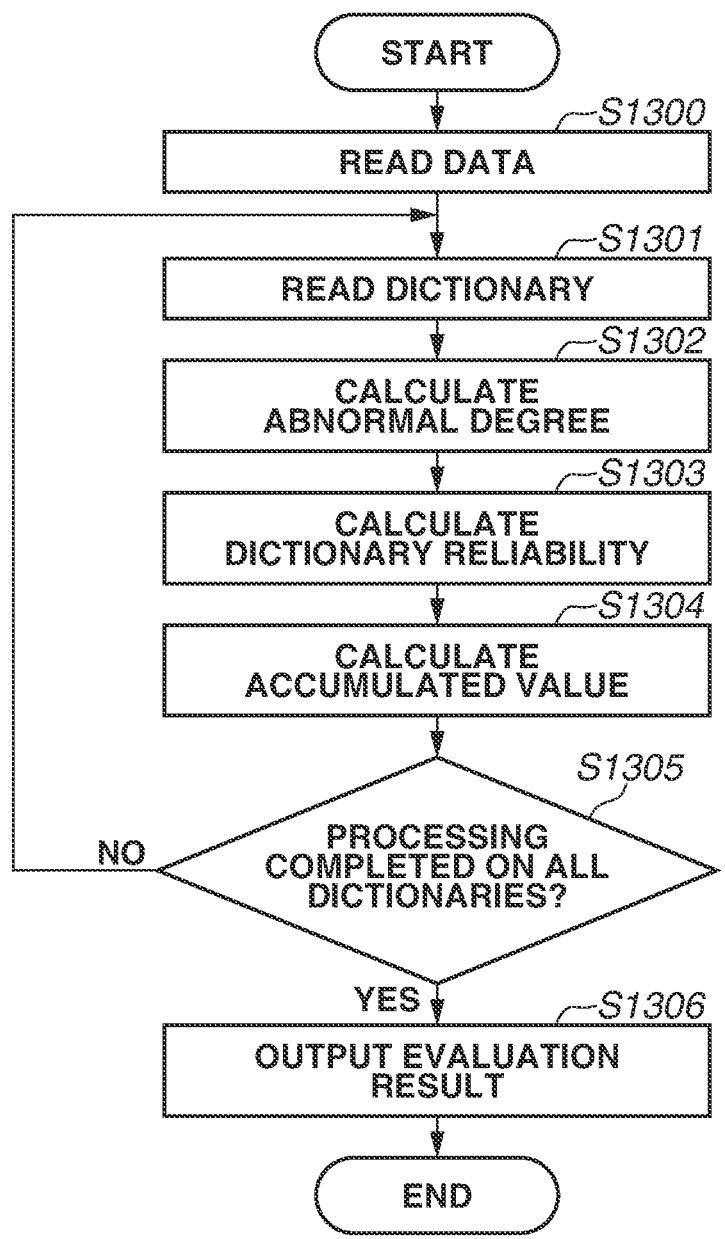
FIG. 13 is a flowchart illustrating evaluation processing according to the third exemplary embodiment.

Next, the evaluation processing by the information processing apparatus 110 according to the third exemplary embodiment is described. FIG. 12 illustrates a software configuration of a processing unit 1200 related to the evaluation processing by the information processing apparatus 110. FIG. 13 is a flowchart illustrating the evaluation processing. As illustrated in FIG. 12, the processing unit 1200 includes a data reading unit 1210, a data storage unit 1211, a staged data processing unit 1220, a dictionary reliability reading unit 1230, a dictionary reliability storage unit 1231, and an output processing unit 1240. The staged data processing unit 1220 includes a dictionary reading unit 1221, a dictionary storage unit 1222, an abnormal degree calculation unit 1223, a dictionary reliability calculation unit 1224, an accumulated value calculation unit 1225, and an evaluation unit 1226. A function of each unit is described along with the evaluation processing (FIG. 13).

In step S1300, the data reading unit 1210 obtains data to be the determination target and reads the data into the data storage unit 1211. The present processing is similar to the processing in step S500 in FIG. 5. Next, in step S1301, the dictionary reading unit 1221 reads the dictionary generated by the dictionary generation processing (FIG. 11) and a value calculated to the dictionary into the dictionary storage unit 1222. The value calculated to the dictionary includes the average $\mu(A^{(t)})$ and the dispersion $\sigma(A^{(t)})$ of the abnormal degree as the data evaluation value of each data included in the data set. When a distribution dictionary is generated, the dictionary reading unit 1221 may read the distribution model as well.

The processing in step S1301 is repeatedly executed, and the dictionary reading unit 1221 reads the first stage dictionary when the processing in step S1301 is executed for the first time in response to the generation of the staged dictionary. Further, the dictionary reading unit 1221 reads the dictionaries in the order of stage such as the second stage dictionary and the third stage dictionary according to the repeat count of the processing in step S1301 (loop processing from step S1301 to step S1305). Hereinbelow, the dictionary read in step S1301 is referred to as the target dictionary.

Next, in step S1302, the abnormal degree calculation unit 1223 calculates an abnormal degree (a deviation degree) $A_i^{(t)}$ of the data and the target dictionary. The present processing is similar to the processing in steps S502 to S504 described with reference to FIG. 5. Next, in step S1303, the dictionary reliability calculation unit 1224 calculates a dictionary reliability to the target dictionary based on the abnormal degree $A_i^{(t)}$. More specifically, the dictionary reliability calculation unit 1224 calculates a dictionary reliability $\alpha_i^{(t)}$ to the target dictionary using (Formula 14). In (Formula 14), "t" represents the number of stages of the dictionary.

$$\alpha_i^{(t)} = 1 - \frac{1}{1 + e^{-a*\tilde{A}_i^{(t)}}} \qquad \text{[Formula 14]}$$

Next, in step S1304, the accumulated value calculation unit 1225 calculates an accumulated value of the dictionary reliabilities up to the t-th stage dictionaries. Next, in step S1305, the evaluation unit 1226 confirms whether the processing from step S1301 to step S1304 has completed on all the dictionaries generated by the dictionary generation processing. When the processing has finished on all the dictionaries (YES in step S1305), the evaluation unit 1226 advances the processing to step S1306. When there is any unprocessed dictionary (NO in step S1305), the evaluation unit 1226 advances the processing to step S1301. In this case, in step S1301, the dictionary reading unit 1221 reads a next stage dictionary of the processed dictionary. Then, subsequent processing is executed. The accumulated value of the dictionary reliability when the processing has completed on all the dictionaries is expressed by (Formula 15).

$$S_i^* = \alpha_i^{(0)}S_i^{(0)} + (1-\alpha_i^{(0)})\alpha_i^{(1)}S_i^{(1)} + (1-\alpha_i^{(0)})$$
$$(1-\alpha_i^{(1)})\alpha_i^{(2)}S_i^{(2)} + \ldots + (1-\alpha_i^{(0)}) \ldots$$
$$\alpha_i^{(T-1)}S_i^{(T-1)} \qquad \text{[Formula 15]}$$

In (Formula 15), "$S_i^*$" represents a matching degree of i-th data with the dictionary learned in stages. "$S_i^{(t)}$" represents a matching degree of the i-th data with the t-th stage dictionary and can be substituted by a reciprocal of the abnormal degree score $A_i^{(t)}$. "$\alpha_i^{(t)}$" represents the dictionary reliability of the i-th data to the t-th stage dictionary calculated by (Formula 14) which is obtained by inverting a coefficient portion of (Formula 13) based on the vertical axis.

In step S1306, the output processing unit 1240 performs control to output the evaluation result. The accumulated value of the dictionary reliability is a weighted average of a matching degree with each dictionary, and the weight is a modification of the reliability to the dictionary. The calculated accumulated value is a value corresponding to the abnormal degree (an index value indicating a degree of matching) obtained by the evaluation processing according to the first and the second exemplary embodiments. In step S1306, the output processing unit 1240 outputs the accumulated value as the evaluation result of the likelihood that the data belongs to the specific category.

As another example, the output processing unit 1240 may further generate a classifier to determine two values, i.e., normal or abnormal from the accumulated value and output the result as the evaluation result. As further another example, the output processing unit 1240 may calculate an accumulated matching degree for each small image sampled from an image, determine quality as the entire image using statistics of all the small images, and output the result as the evaluation result.

As described above, the inspection system 100 according to the third exemplary embodiment indexes a reconfiguration ability of the dictionary as a continuous value like $S_i^{(t)}$ instead of binarization of whether to use data for learning or not in the process of staged dictionary generation. In addition, the inspection system 100 indexes the reconfiguration ability of the dictionary as a continuous value like $S_i^{(t)}$ in determination. Accordingly, the inspection system 100 can learn (generate) an appropriate dictionary.

Figure 14:
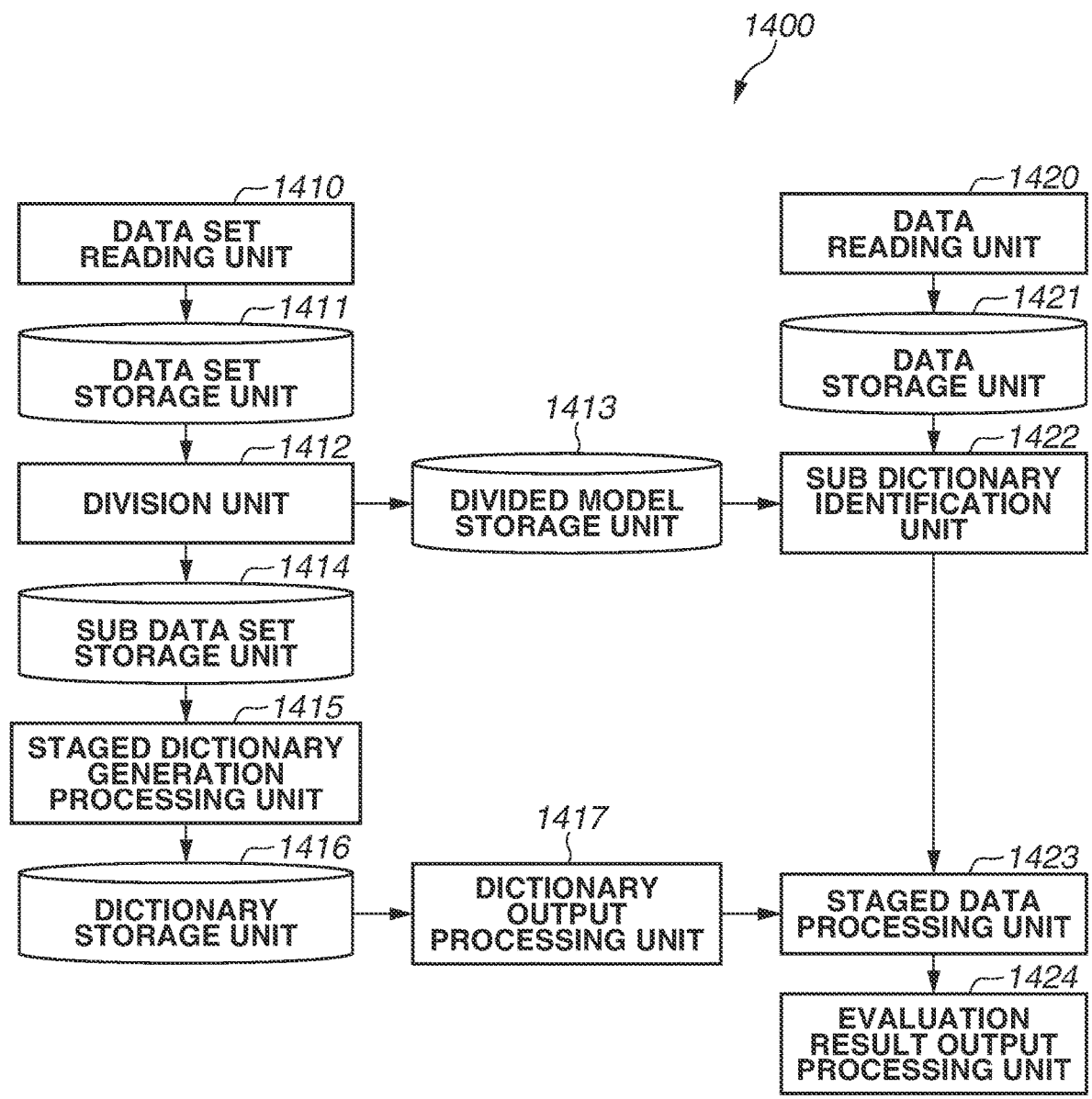
FIG. 14 illustrates a software configuration of a processing unit according to a fourth exemplary embodiment.
Figure 15:
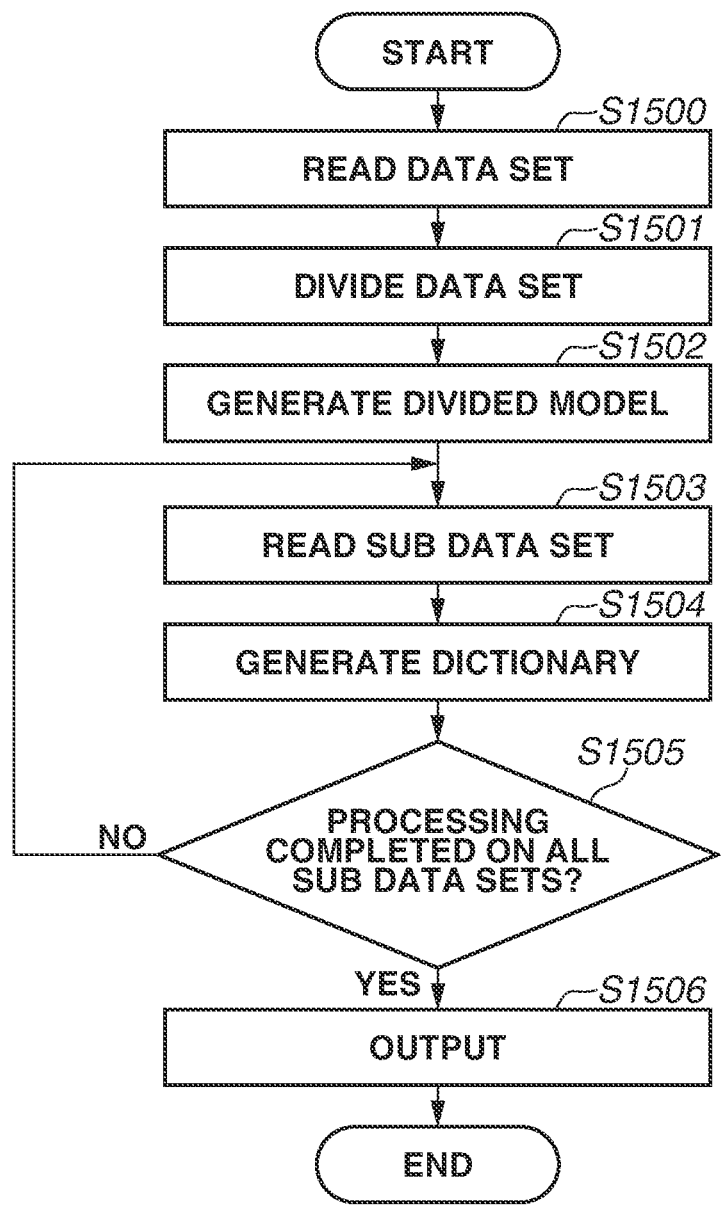
FIG. 15 is a flowchart illustrating dictionary generation processing according to the fourth exemplary embodiment.
Figure 16:
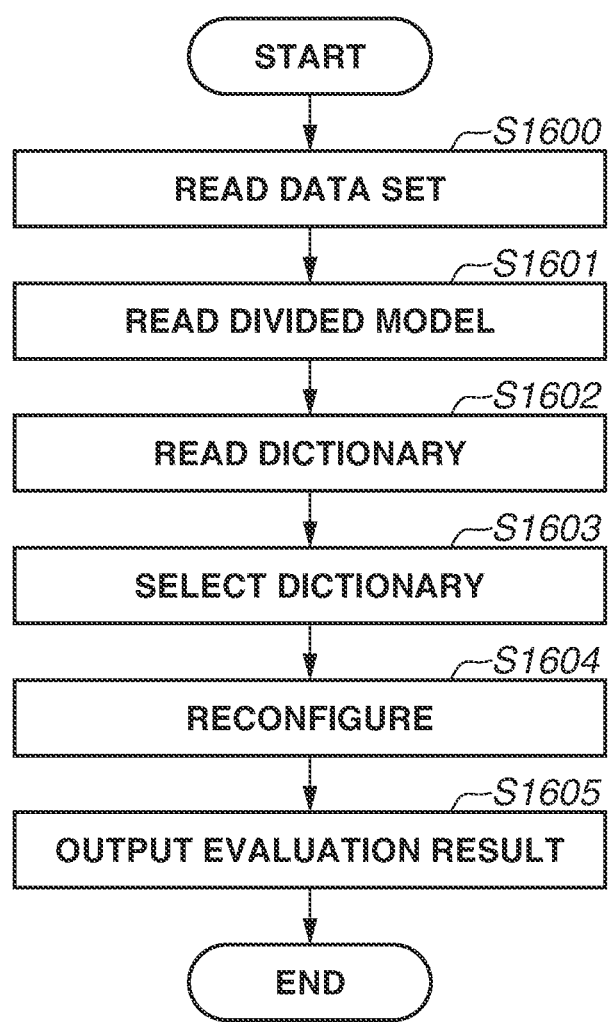
FIG. 16 is a flowchart illustrating evaluation processing according to the fourth exemplary embodiment.

Next, an inspection system 100 according to a fourth exemplary embodiment is described. According to the present exemplary embodiment, the information processing apparatus 110 divides a data space into sub spaces corresponding to multimodality of data distribution and performs dictionary learning and evaluation on each sub space. Hereinbelow, a different point of the inspection system 100 according to the fourth exemplary embodiment from the inspection system 100 according to the other exemplary embodiments is described. FIG. 14 illustrates a software configuration of a processing unit 1400 related to dictionary generation processing and evaluation processing according to the fourth exemplary embodiment. FIG. 15 is a flowchart illustrating the dictionary generation processing according to the fourth exemplary embodiment. FIG. 16 is a flowchart illustrating the evaluation processing according to the fourth exemplary embodiment.

As illustrated in FIG. 14, the processing unit 1400 includes a data set reading unit 1410, a data set storage unit 1411, a division unit 1412, a divided model storage unit 1413, a sub data set storage unit 1414, and a staged dictionary generation processing unit 1415. The processing unit 1400 further includes a dictionary storage unit 1416, a dictionary output processing unit 1417, a data reading unit 1420, a data storage unit 1421, a sub dictionary identification unit 1422, a staged data processing unit 1423, and an evaluation result output processing unit 1424. A function of each unit is described along with FIGS. 14 and 15.

In the dictionary generation processing in FIG. 15, first in step S1500, the data set reading unit 1410 reads a data set into the data set storage unit 1411. The present processing is similar to the processing in step S300 in FIG. 3. Next, in step S1501, the division unit 1412 divides the data set into a plurality of data sets. In division, various clustering methods can be used. According to the present exemplary embodiment, the division unit 1412 selects minority data by the processing from step S301 to step S307 in FIG. 3 and performs clustering based on information of an intermediate result such as the reconfiguration information obtained when selecting the minority data. Accordingly, division processing can be performed efficiently. Specific processing for dividing the data set is not limited to that in the present exemplary embodiment, and the data set may be divided without using the minority data.

Division methods using the minority data include following methods.

A data division method 1: As data to be used in cluster generation, the reconfiguration coefficient vector (Formula 7) and the reconfiguration information vector yi' may be used in addition to using of a patch as it is and a discrete cosine transform (DCT) result of the patch. When the data space is divided, various basic clustering methods can be used such as agglomerative hierarchical cluster generation and non-hierarchical optimization base K-means clustering. In addition, the dictionary generation method, such as K-SVD, described according to the first exemplary embodiment may be applied to the minority data set, and obtained reference data may be set to the center of cluster.

A data division method 2: Data to be used in cluster generation is information about which reference data is used for reconfiguration of original data. The method is used when the reconfiguration method is orthogonal matching pursuit (OMP). For example, in the case that the number of reference data pieces K=8 and the number of selected reference data pieces k=2, the minority data set is automatically divided into $N_C = {_k}C_K = 28$ pieces of clusters after the reconfiguration processing.

A data division method 3: Extension of the data division method 2. When the number of reference data pieces is large, the number of reference data pairs also increases, so that the number of clusters needs to be controlled. After $N_c$ pieces of clusters are obtained, similar clusters are merged to reduce the number of clusters. More specifically, a process for calculating an intercluster distance using the cluster obtained by the data division method 2 as an intermediate stage of agglomerative clustering and merging similar clusters is repeated until the clusters reach a specified number of clusters. Regarding an intercluster distance calculation method, a nearest neighbor method, a group average method, between-cluster variance, Bayes error rate and the like may be used.

Next, in step S1502, the division unit 1412 records a divided model in the divided model storage unit 1413. The divided model is information about a parameter (the center of cluster, etc.) of the cluster generation obtained in step S1501. Next, in step S1503, the staged dictionary generation processing unit 1415 obtains one sub data set from the sub data set storage unit 1414. Next, in step S1504, the staged dictionary generation processing unit 1415 performs the dictionary generation processing using the sub data set obtained in step S1503 as the target data set and records the dictionary in the dictionary storage unit 1416. The processing in step S1504 is similar to the processing from step S1101 to step S1107 in FIG. 11. As another example, in step S1504, the information processing apparatus 110 may perform the processing from step S301 to step S309 in FIG. 3.

Next, in step S1505, the staged dictionary generation processing unit 1415 confirms whether the processing in step S1504 is completed on all of the sub data sets. When the processing is completed on all of the sub data sets (YES in step S1505), the staged dictionary generation processing unit 1415 advances the processing to step S1506. When there is any unprocessed sub data set (NO in step S1505), the staged dictionary generation processing unit 1415 advances the processing to step S1503. In this case, in step S1503, the staged dictionary generation processing unit 1415 obtains one unprocessed sub data set. Then, subsequent processing is executed. In step S1506, the dictionary output processing unit 1417 performs control to output the generated dictionary. Thus, the dictionary generation processing is completed.

Next, the evaluation processing is described. In the evaluation processing in FIG. 16, first in step S1600, the data reading unit 1420 obtains data to be the determination target and reads the data into the data storage unit 1421. The present processing is similar to the processing in step S500 in FIG. 5. Next, in step S1601, the sub dictionary identification unit 1422 obtains the divided model of each cluster stored in the divided model storage unit 1413. Next, in step S1602, the staged data processing unit 1423 reads the dictionary of each cluster obtained by the dictionary generation processing.

Next, in step S1603, the staged data processing unit 1423 selects the dictionary to be used for determination of the target data. More specifically, the staged data processing unit 1423 calculates a distance between the target data and the center of each cluster and selects the dictionary corresponding to the cluster of which the distance is the shortest. Next, in step S1604, the staged data processing unit 1423 reconfigures the target data using the dictionary selected in step S1605.

Next, in step S1605, the evaluation result output processing unit 1424 performs control to output the determination result. The processing in steps S1604 and S1605 is similar to the processing in steps S502 to S510 described with reference to FIG. 5 according to the first exemplary embodiment. As another example, the information processing apparatus 110 may specify a matching degree with the dictionary using the dictionary of each cluster without specifying a cluster to which data belongs and performs control to output an average of the matching degree with the dictionary of each cluster as the determination result in the evaluation processing.

When there is minority data, it can be considered that multimodality appears in a distribution of data. When the dictionary learning is performed with respect to multimodality data, the reference data expressing an intercluster difference is learned, however, an issue occurs that a fine expression is insufficient in the cluster. The information processing apparatus 110 according to the present exemplary embodiment performs the dictionary generation and the determination by dividing the data space into the sub spaces and thus can improve a fine expression ability in the cluster with respect to such an issue.

As a modification of the fourth exemplary embodiment, data dividing processing is not limited to that described in the present exemplary embodiment. When a size of a patch is small, it is difficult to determine whether the patch is a portion of the defect area or a portion of the normal area, so that patch-based clustering cannot provide an instinctive result. In such a case, it is desirable to obtain a large area by considering a peripheral patch and then perform clustering. However, in this case, a dimension number of data becomes higher, and it becomes difficult to obtain good clustering result. In this regard, the information processing apparatus 110 may perform clustering in response to a user operation.

Figure 17:
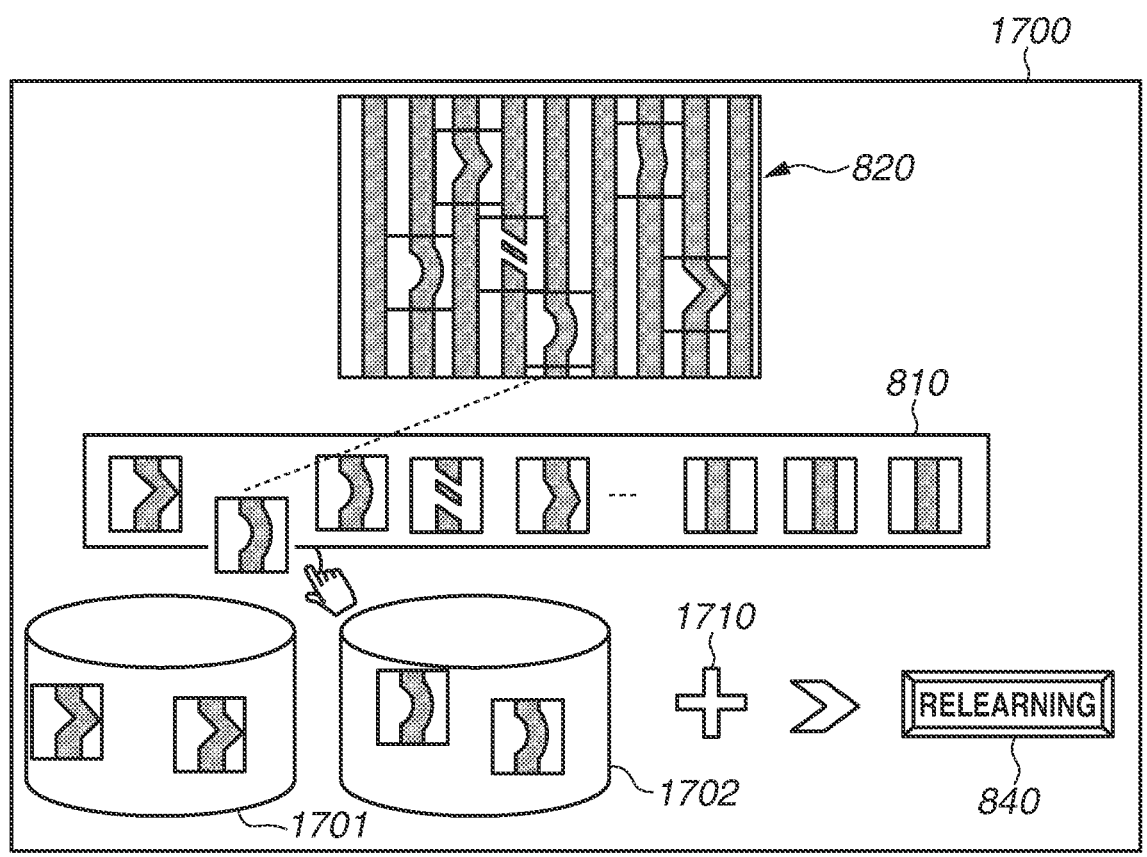
FIG. 17 illustrates an example of a display screen according to a modification.

FIG. 17 illustrates an example of a display screen according to the modification. The data list 810, the original image 820, and the relearning button 840 are displayed on a display screen 1700. In addition, two areas 1701 and 1702 corresponding to the clusters and an addition button 1710 are displayed. The areas 1701 and 1702 respectively belong different clusters. Data transferred to the area 1701 by a user belongs to the cluster corresponding to the area 1701, and data transferred to the area 1702 belongs to the cluster corresponding to the area 1702. In addition, according to the present modification, every time a user presses the addition button 1710, an area corresponding to a cluster is added and displayed. Thus, clusters of which number corresponds to a user operation can be generated, and each data can be distributed to an appropriate cluster according to the user operation. The present modification can discriminate data at the same time as selection and thus is effective when multimodality appears in data compared to minority data selection by a user according to the second exemplary embodiment.

The dictionaries generated in the above-described exemplary embodiments are concerned with generation methods of expression dictionaries for expressing a specific category. These methods can be applied to generation of a discriminative dictionary for discriminating a specific category and a non-specific category. The expression dictionary is effective when a type of an unknown defect is difficult to predict. On the other hand, the discriminative dictionary is effective, for example, when a type of a defect is limited.

When the discriminative dictionary is learned, it is necessary to make learning data label information indicating whether learning data belongs to the specific category or not known information. Regarding the classifier, various classifiers, such as a linear discriminant classifier, a support vector machine, and a neural network can be used. A matching degree with the discriminative dictionary expresses a degree of coincidence between a discrimination result by the classifier and the label information. When the neural network is used as the classifier, a discrimination method can be considered in which feature extraction is performed by an auto encoder using many multiresolution small images clipped from a learning image as input data, and discriminative dictionary learning is performed using logistic regression on the final stage. In addition, discrimination can be performed by learning a convolutional neural network using the many small images clipped from the learning image as the input data.

As an exemplary embodiment using the discriminative dictionary, according to the first exemplary embodiment, the information processing apparatus 110 may use data of which a category of a discrimination result does not coincide with a known category in relearning. As another exemplary embodiment using the discriminative dictionary, the information processing apparatus 110 may respectively provide relearning target pools in the specific category and the non-specific category in a user interface according to the second exemplary embodiment. The information processing apparatus 110 determines the order of display area according to a height of an abnormal degree (a discrimination score) as in the case of the second exemplary embodiment. However, when a user selects an area, the information processing apparatus 110 performs relearning of the discriminative dictionary respectively on the specific category and the non-specific category so as to move an area of one category entering in the other's category to a relearning target pool of its own category. According to the present exemplary embodiment, the discriminative dictionary learning can be performed by feedback by a user to a discrimination result if data of which label information is only partly known exists in the learning data.

As another exemplary embodiment using the discriminative dictionary, according to the third exemplary embodiment, the information processing apparatus 110 compares the category of the discrimination result with the known category using whether the learning data belongs to the specific category or not as the known information. Further, when the both categories do not coincide with each other, the information processing apparatus 110 may perform relearning by focusing on the data. In this case, it can be considered that how easy the category is confused with the other category is used as a data weight in relearning using the discrimination score.

As further another exemplary embodiment using the discriminative dictionary, when multimodality appears in data belonging to the specific category according to the fourth exemplary embodiment, the above-described method may be applied to each of divided data groups to generate a plurality of sub classifiers.

According to the above-described exemplary embodiments (the first to the fourth exemplary embodiments), the examples are described in which the inspection system 100 is applied to appearance inspection, however, an application target of the inspection system 100 is not limited to the above-described exemplary embodiments. As another example, the above-described exemplary embodiments can be applied to evaluation processing for evaluating whether a moving image includes a specific scene. For example, in a case where an abnormal behavior is detected from a monitoring camera, and a behavior that a person is walking is regarded as a normal behavior and a behavior other than walking is regarded as an abnormal behavior, a behavior that walking persons pass each other in a scene is not regarded as normal and detected as an abnormal behavior. However, if a behavior that people pass each other is regarded as a minority pattern, the methods in the above-described exemplary embodiments can be applied. Further, for example, in the case in which a dictionary can be generated for expressing data, such as audio data, ultrasonic waveform analysis, other multimedia data, and text data, the methods in the above-described exemplary embodiments can be applied to data in another format.

Further, the inspection system 100 according to the above-described exemplary embodiments determines whether data of which a category is unknown belongs to the specific category, however, the inspection system 100 can be applied to a multiclass classification issue for determining data of which a category is unknown belongs to which of many specific categories. In this case, the inspection system 100 performs the staged dictionary learning on each category when learning the dictionary and, when evaluating, calculates a matching degree of evaluation data with the dictionary of each category and may output a result that the data belongs to a category with the highest matching degree or the data does not belong to any category.

According to embodiments of the present invention, an appropriate dictionary can be learned which has a high expression ability of minority data while preventing reduction of an expression ability of majority data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-005275, filed Jan. 16, 2017, which is hereby incorporated by reference herein in its entirety.

What is claimed is:

1. A dictionary generation apparatus which generates a dictionary that expresses features of a plurality of pieces of first learning data that belongs to a specific category indicating that a state indicated by belonging data is normal, the dictionary generation apparatus comprising:
  one or more processors; and
  at least one memory storing executable instructions, which when executed by the one or more processors, cause the dictionary generation apparatus to:
    generate a first dictionary capable of reconfiguring the plurality of pieces of first learning data based on the plurality of pieces of first learning data belonging to the specific category;
    based on information indicating a degree of matching of the reconfigured data with the first learning data used for generating the first dictionary using the generated first dictionary, select a portion of second learning data having a degree of matching with the data that is reconfigured using the first dictionary among the plurality of pieces of first learning data being lower than a first threshold and an abnormal degree indicating that a state indicated by data is abnormal is lower than a second threshold; and
    generate, by using the portion of the second learning data, a second dictionary capable of reconfiguring the second learning data, which is used to determine whether the state indicated by data that is determined to be abnormal by using the first dictionary is normal or abnormal.

2. The dictionary generation apparatus according to claim 1, wherein the portion of the second learning data is selected based on the degree of matching with the data that is reconfigured using the first dictionary among the plurality of pieces of the first learning data being lower than the first threshold and the abnormal degree indicating that the state indicated by the data is abnormal is lower than the second threshold.

3. The dictionary generation apparatus according to claim 1, wherein the executable instructions, when executed by the one or more processors, further cause the dictionary generation apparatus to:
  reconfigure the portion of the second learning data used for generation of the second dictionary using the second dictionary,
  wherein the portion of the second learning data is selected based on reconfiguration information obtained by the reconfiguration of the data that is reconfigured using the first dictionary.

4. The dictionary generation apparatus according to claim 3, wherein
  the dictionary is a dictionary for sparse coding, and
  the reconfiguration information includes an L1 norm of a combination coefficient of sparse coding.

5. The dictionary generation apparatus according to claim 3, further comprising:
  a projection error evaluation unit configured to calculate, for each the learning data, a projection error generated when a reconfiguration vector included in the reconfiguration information is projected to a partial space obtained by principal component analysis of the reconfiguration vector,
  wherein the selection unit selects a portion of the learning data based on the projection error.

6. The dictionary generation apparatus according to claim 5, further comprising:
  a model generation unit configured to generate a distribution model of a projection error of each the learning data,
  wherein the selection unit selects a portion of the learning data based on the distribution model.

7. The dictionary generation apparatus according to claim 6, further comprising:
  a conversion unit configured to convert the projection error into an index value indicating a degree of matching with the first dictionary based on the distribution model,
  wherein the selection unit selects a portion of the learning data based on the index value.

8. The dictionary generation apparatus according to claim 1, wherein the executable instructions, when executed by the one or more processors, further cause the dictionary generation apparatus to:
  based on information indicating a degree of matching of data that is reconfigured using the second dictionary with the portion of the second learning data used for generation of the second dictionary, select a portion of third learning data having a degree of matching with the data that is reconfigured using the second dictionary among the second learning data being lower than a third threshold and an abnormal degree indicating that a state indicated by data is abnormal is lower than a fourth threshold; and
  generate, by using the portion of the third learning data, a third dictionary capable of reconfiguring the third learning data, which is used to determine whether the state indicated by data that is determined to be abnormal by using the second dictionary is normal or abnormal.

9. The dictionary generation apparatus according to claim 1, further comprising:
  a multiresolution unit configured to generate a plurality of learning data pieces having different resolutions from each the learning data used for generation of the first dictionary,
  wherein the selection unit selects a portion of learning data from a plurality of learning data pieces of each resolution based on a degree of matching of the learning data used for generation of each dictionary with respect to a plurality of the first dictionaries generated based on the plurality of learning data pieces of each resolution, and
  wherein the generation unit generates a second dictionary of each resolution using the learning data of each resolution selected by the selection unit.

10. The dictionary generation apparatus according to claim 1, further comprising:
  a division unit configured to divide the learning data belonging to the specific category into a plurality of data sets based on a feature,
  wherein the selection unit selects a part of learning data from each of the plurality of data sets based on a degree of matching of the learning data used for generation of each of the first dictionaries with respect to each of a plurality of the first dictionaries generated based on each of the plurality of data sets, and
  wherein the generation unit generates the second dictionary corresponding to each of the plurality of data sets.

11. A method for generating a dictionary that expresses features of a plurality of pieces of first learning data that belongs to a specific category indicating that a state indicated by belonging data is normal, the method comprising:
  generating a first dictionary capable of reconfiguring the plurality of pieces of first learning data based on the plurality of pieces of first learning data belonging to the specific category;
  based on information indicating a degree of matching of the reconfigured data with the first learning data used for generating the first dictionary using the generated first dictionary, selecting a portion of second learning data having a degree of matching with the data that is reconfigured using the first dictionary among the plurality of pieces of first learning data being lower than a first threshold and an abnormal degree indicating that a state indicated by data is abnormal is lower than a second threshold; and
  generating, by using the portion of the second learning data, a second dictionary capable of reconfiguring the second learning data, which is used to determine whether the state indicated by data that is determined to be abnormal by using the first dictionary is normal or abnormal.

12. A non-transitory computer-readable storage medium storing a program for causing a computer to execute a method for generating a dictionary that expresses features of a plurality of pieces of first learning data that belongs to a specific category indicating that a state indicated by belonging data is normal, the method comprising:
  generating a first dictionary capable of reconfiguring the plurality of pieces of first learning data based on the plurality of pieces of first learning data belonging to the specific category;
  based on information indicating a degree of matching of the reconfigured data with the first learning data used for generating the first dictionary using the generated first dictionary, selecting a portion of second learning data having a degree of matching with the data that is reconfigured using the first dictionary among the plurality of pieces of first learning data being lower than a first threshold and an abnormal degree indicating that a state indicated by data is abnormal is lower than a second threshold; and
  generating, by using the portion of the second learning data, a second dictionary capable of reconfiguring the second learning data, which is used to determine whether the state indicated by data that is determined to be abnormal by using the first dictionary is normal or abnormal.

* * * * *